US006259810B1

(12) United States Patent
Gill et al.

(10) Patent No.: US 6,259,810 B1
(45) Date of Patent: *Jul. 10, 2001

(54) METHOD AND SYSTEM OF DECODING COMPRESSED IMAGE DATA

(75) Inventors: John W. Gill; Bruce A. Johnson, both of Woodinville, WA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/838,186

(22) Filed: Apr. 15, 1997

(51) Int. Cl.[7] ....................................................... G06K 9/00
(52) U.S. Cl. .......................... 382/166; 382/194; 382/233; 382/245; 358/261.4
(58) Field of Search .................................. 382/166, 194, 382/221, 232, 233, 234, 235, 245, 253; 358/426, 261.4; 345/431, 430, 428

(56) References Cited

U.S. PATENT DOCUMENTS

| 5,064,144 | * | 11/1991 | Edelson et al. | 340/703 |
|---|---|---|---|---|
| 5,065,144 | * | 11/1991 | Edelson et al. | 340/703 |
| 5,218,431 | * | 6/1993 | Gleicher et al. | 358/136 |
| 5,295,203 | * | 3/1994 | Krause et al. | 382/56 |
| 5,313,534 | * | 5/1994 | Burel | 382/56 |
| 5,339,164 | * | 8/1994 | Lim | 358/426 |
| 5,426,379 | * | 6/1995 | Trimberger | 326/39 |
| 5,497,434 | * | 3/1996 | Wilson | 382/56 |
| 5,572,235 | * | 11/1996 | Mical et al. | 395/102 |
| 5,659,631 | * | 8/1997 | Gormish et al. | 382/166 |
| 5,684,895 | * | 11/1997 | Harrington | 382/166 |
| 5,727,090 | * | 3/1998 | Yellin | 382/235 |
| 5,734,744 | * | 3/1998 | Wittenstein et al. | 382/166 |
| 5,768,481 | * | 6/1998 | Chan et al. | 358/530 |
| 5,777,749 | * | 7/1998 | Noda et al. | 358/261.3 |

* cited by examiner

*Primary Examiner*—Matthew C. Bella
*Assistant Examiner*—Sheela Chawans
(74) *Attorney, Agent, or Firm*—Michalik & Wylie, PLLC

(57) ABSTRACT

A method and system of encoding and decoding image data in images having less than 128 distinct colors. Eight bit data bytes representing the color of each pixel data are re-indexed for each pixel to seven or less bits, and a sub-palette stores the relationship between the re-indexed colors and the original eight-bit color values. The remaining bits in the byte store run lengths of pixels that have contiguous colors. Further data compression is achieved by grouping pixels into rows, eliminating any duplicate rows and identifying the pixel data by a series of row pointers. Still further compression is accomplished by dropping representations of transparent pixels from the end of rows and representing a number of transparent pixels at the beginning of rows with a single byte. The compressed data is efficiently decoded using the row pointers to expedite vertical clipping of the image and adjusting horizontal clipping for leading and trailing transparent pixels.

39 Claims, 29 Drawing Sheets

FIG. 2

| $50_{07}$ | $50_{17}$ | $50_{27}$ | $50_{37}$ | $50_{47}$ | $50_{57}$ | $50_{67}$ | $50_{77}$ |
|---|---|---|---|---|---|---|---|
| 0 | 252 | 255 | 255 | 255 | 44 | 0 | 252 |
| 0 | 178 | 255 | 255 | 255 | 42 | 0 | 252 |
| 42 | 177 | 255 | 255 | 255 | 43 | 42 | 178 |
| 42 | 176 | 255 | 255 | 255 | 2 | 42 | 179 |
| 3 | 3 | 3 | 3 | 178 | 2 | 3 | 42 |
| 3 | 3 | 3 | 3 | 3 | 254 | 3 | 254 |
| 3 | 3 | 3 | 3 | 1 | 253 | 3 | 177 |
| 3 | 3 | 3 | 3 | 1 | 253 | 3 | 177 |

| 31, 129, 231 | 31, 129, 231 | 31, 129, 231 | 31, 129, 231 | 66, 18, 3 | 66, 18, 3 | 0, 67, 131 | 0, 67, 131 |
| --- | --- | --- | --- | --- | --- | --- | --- |
| 31, 129, 231 | 31, 129, 231 | 31, 129, 231 | 31, 129, 231 | 0, 44, 1 | 0, 6, 200 | 127, 122, 46 | 221, 47, 0 |
| 31, 129, 231 | 31, 129, 231 | 31, 129, 231 | 31, 129, 231 | 255, 255, 255 | 255, 255, 255 | 255, 255, 255 | 255, 255, 255 |
| 31, 129, 231 | 31, 129, 231 | 31, 129, 231 | 31, 129, 231 | 255, 255, 255 | 255, 255, 255 | 255, 255, 255 | 255, 255, 255 |
| 9, 44, 200 | 9, 44, 200 | 31, 129, 231 | 127, 122, 46 | 255, 255, 255 | 255, 255, 255 | 255, 255, 255 | 255, 255, 255 |
| 145, 36, 222 | 145, 137, 200 | 145, 137, 200 | 127, 0, 0 | 127, 0, 0 | 244, 64, 39 | 66, 18, 3 | 6, 55, 0 |
| 31, 129, 231 | 31, 129, 231 | 31, 129, 231 | 31, 129, 231 | 66, 18, 3 | 66, 18, 3 | 0, 67, 131 | 0, 67, 131 |
| 0, 6, 200 | 0, 6, 200 | 145, 137, 200 | 66, 18, 3 | 39, 38, 200 | 127, 122, 46 | 221, 47, 0 | 221, 47, 0 |

|  | R | G | B |
|---|---|---|---|
| 0 → | 0 | 67 | 131 |
| 1 → | 9 | 44 | 200 |
| 2 → | 127 | 0 | 0 |
| 3 → | 31 | 129 | 231 |
| ⋮ | ⋮ | ⋮ | ⋮ |
| 42 → | 66 | 18 | 3 |
| 43 → | 244 | 64 | 39 |
| 44 → | 6 | 55 | 0 |
| ⋮ | ⋮ | ⋮ | ⋮ |
| 176 → | 0 | 44 | 1 |
| 177 → | 0 | 6 | 200 |
| 178 → | 127 | 122 | 46 |
| 179 → | 39 | 38 | 200 |
| ⋮ | ⋮ | ⋮ | ⋮ |
| 252 → | 221 | 47 | 0 |
| 253 → | 145 | 36 | 222 |
| 254 → | 145 | 137 | 200 |
| 255 → | ~ | ~ | ~ |

| | | | | | | | |
|---|---|---|---|---|---|---|---|
| | | | | | | 0/13 | 0/7 |
| | | | | | | 0/2 | 0/6 |
| | | | | 0/7 | | 0/12 | 0/14 |
| | | | 0/6 | 0/6 | | 1/11 | 0/2 |
| | | 1/3 | 0/5 | 0/6 | | 1/11 | 0/2 |
| | | 1/2 | 0/4 | 0/1 | 0/10 | 0/10 | |
| | | 1/1 | 0/1 | 0/1 | 0/10 | 0/10 | |
| | 3/1 | 3/1 | 3/1 | 1/8 | 1/9 | 1/5 | |
| 78 → | 0 | 0 | 0 | 0 | 0 | 0 | |
| 77 → | 0004 | 0006 | 0002 | 0004 | 0007 | 0007 | |
| 76 ↑ | ↑ R0 | ↑ R1 | ↑ R2 | ↑ R3 | ↑ R4 | ↑ R5 | |

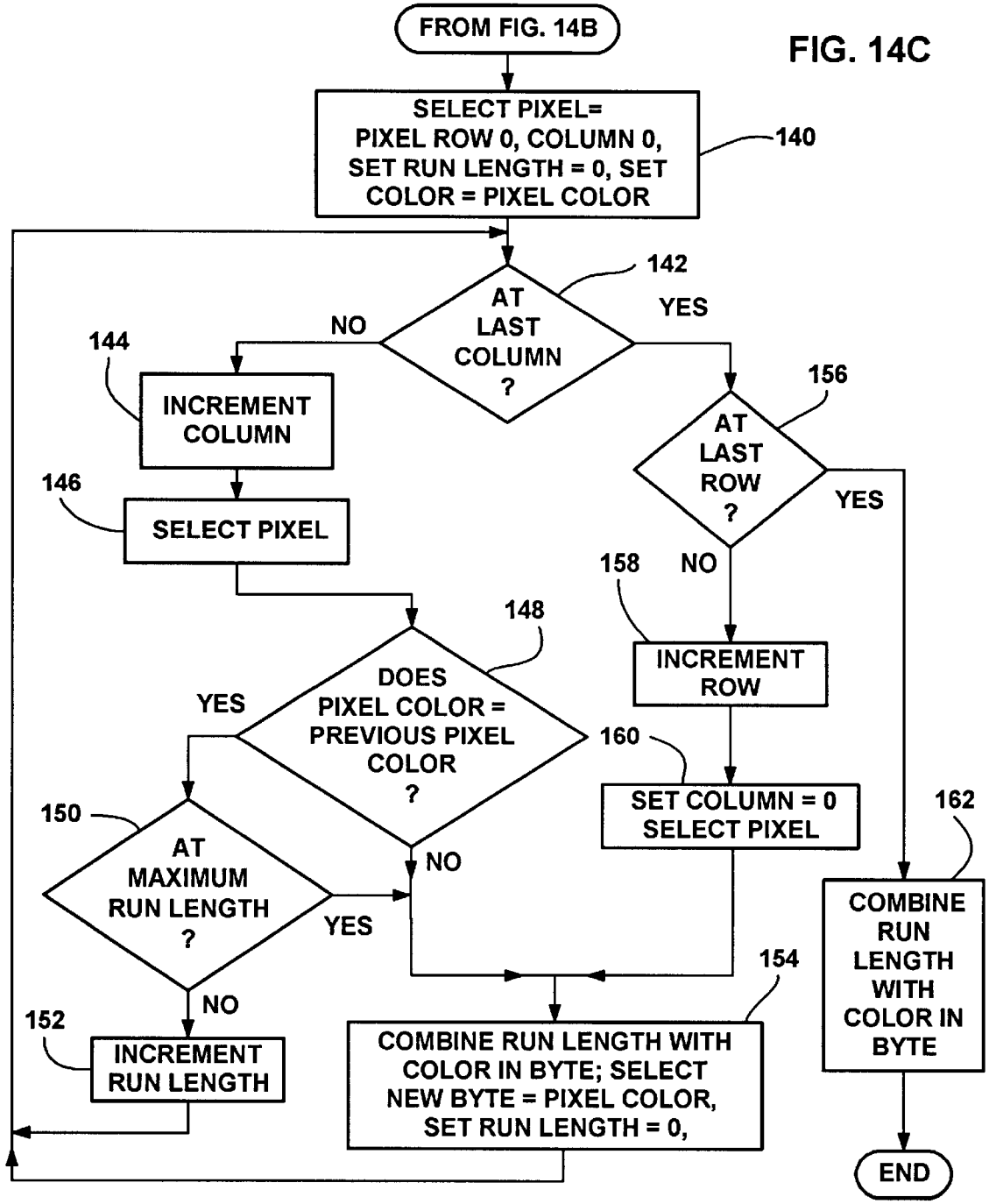

| 0 | 0 | 0 | 0 | 1 | 0 | 0 | 0 | 0 |
|---|---|---|---|---|---|---|---|---|
| 0 | 0 | 0 | 1 | 1 | 1 | 0 | 0 | 0 |
| 0 | 0 | 2 | 2 | 2 | 2 | 2 | 0 | 0 |
| 0 | 3 | 1 | 2 | 4 | 5 | 6 | 7 | 0 |
| 1 | 1 | 1 | 1 | 2 | 2 | 2 | 2 | 2 |
| 1 | 1 | 1 | 1 | 2 | 2 | 2 | 2 | 2 |
| 0 | 3 | 1 | 2 | 4 | 5 | 6 | 7 | 0 |
| 0 | 0 | 2 | 2 | 2 | 2 | 2 | 0 | 0 |
| 0 | 0 | 0 | 1 | 1 | 1 | 0 | 0 | 0 |
| 0 | 0 | 0 | 0 | 1 | 0 | 0 | 0 | 0 |

FIG. 17

METHOD AND SYSTEM OF DECODING COMPRESSED IMAGE DATA

CROSS-REFERENCE TO RELATED APPLICATION

The present invention is related to co-pending U.S. patent application Ser. No. 08/838,187 entitled METHOD AND SYSTEM OF VARIABLE RUN LENGTH IMAGE ENCODING USING SUB-PALETTE, by John W. Gill and Bruce A. Johnson, filed concurrently herewith and assigned to the assignee of the present invention.

FIELD OF THE INVENTION

The invention relates generally to video image data, and more particularly to a method and system for rapidly and efficiently decoding stored video information.

BACKGROUND OF THE INVENTION

In one well-known color scheme, each pixel in an image is represented by a single byte having a value corresponding to the pixel's color. The value of the byte serves as an index to a 256-byte color table, or palette. The palette is a 256 by 3 byte array, with each indexed entry in the palette having a first byte specifying a red level, a second byte specifying a green level and a third byte specifying a blue level. In another well-known scheme referred to as 24-bit true color, each pixel has four bytes directly stored therefor, one red, one green, one blue and one for various flags. In either scheme, the image may be stored as an array of such bytes.

The byte arrays representing video images are often compressed to save both storage space and the amount of time required to transfer the data from one medium (e.g., CD-ROM) to another (e.g., random access memory). For example, with the 256-byte color scheme, existing image data compression techniques utilize a two-byte format, with a first byte representing a run length of contiguous pixels of one color and the second byte identifying that color. This compression scheme works well with images having long runs (up to 256 pixels) of pixels of the same color. However, where there are few runs of constant color, the encoding scheme approaches two bytes per pixel, which is worse than leaving the data uncompressed with one byte per pixel.

Other types of compression schemes are applied to previously fixed descriptions of the pixel data. One such technique, known as LZW, (which stores files with a ".GIF" extension), examines fixed image data (or other types of data) for patterns of replicated data. LZW then encodes the data as a pattern length followed by the data in that pattern, and the compressed image data includes references to the patterns. As can be appreciated, such a compression technique functions well when there are a few patterns repeated many times, but is often not very useful for compressing many other types of images.

Another compression scheme applied to fixed image data is known as JPEG, which first breaks an image into rectangular portions, and then applies algorithms to reduce the amount of data required to describe those portions. Significantly, JPEG image compression is not lossless, that is, the pixel information cannot be precisely recreated from the compressed data. In short, existing image data-compression schemes have a number of drawbacks associated therewith, and no one compression scheme is optimal for every image.

Moreover, consideration must be given to the decompression of the image, particularly given the likelihood that an end-user decompressing a compressed image has a less-powerful computer than the manufacturer or the like that originally compressed the image. In general, as the compression scheme increases in complexity, the amount of compression achieved is increased. However, often times the more complex the compression scheme, the greater the cost of decompression in terms of time and/or processing power required to decode the image.

OBJECTS AND SUMMARY OF THE INVENTION

Accordingly, it is an object of the invention to provide a method and system for reducing the amount of data required to encode an image while providing for efficient decoding of the encoded image.

It is a related object to provide such a method and system that encodes and decodes an image without any loss of data.

Another object is to provide a method and system of the above kind that redefines the pixel description data as a function of the image data.

Yet another object is to provide a compression scheme as characterized above that facilitates efficient and rapid decompression.

Another object is to provide a method and system for decoding that can be incorporated into the block transfer routines of an operating system or the like.

Briefly, the present invention provides a method and system for decoding compressed data into an image of pixels. The compressed data is arranged such that each row of pixels in the image to be decoded has a distinct set of data corresponding thereto in the compressed data, and further includes a pointer to each distinct set of data. The rows of pixels to be decoded into the image are determined, and for each row of pixels determined, the pointer to the distinct set of data therefor is located, a destination memory location corresponding to the row of pixels to be decoded is determined, the distinct set of data is decoded into actual pixel data, and the actual pixel data is written into the determined destination memory location.

Other objects and advantages will become apparent from the following detailed description when taken in conjunction with the drawings, in which:

BRIEF DESCRIPTION OF THE DRAWINGS

FIG. 2 is a diagram of an array of pixels forming an image;

FIG. 3 is a representation of a data array used to store pixel information for the image of FIG. 2;

FIG. 4 is a representation of an alternative data array used to store pixel information for the image of FIG. 2;

FIG. 5 is a representation of a 256-color palette used to store RGB color information for displayed images;

FIG. 6 is a representation of a reduced-color sub-palette used to store color information for the image of FIG. 2;

FIG. 7 is a representation of a temporary array used to store information about the sub-palette of FIG. 6;

FIG. 8 is a representation of an alternative reduced-color sub-palette used to store RGB color information for the image of FIG. 2;

FIG. 10 is a representation of rows of data bytes used to store byte-compressed pixel information for the image of FIG. 2;

FIG. 11 is a representation of row source data composed from the rows of bytes shown in FIG. 10;

FIGS. 14A–14C comprise a flow diagram representing the general steps taken in compressing an image in accordance with the present invention;

FIG. 17 is a representation of the array of pixels of FIG. 16 including transparent pixels and having reduced color information associated therewith;

DETAILED DESCRIPTION OF THE PREFERRED EMBODIMENT

Figure 1:
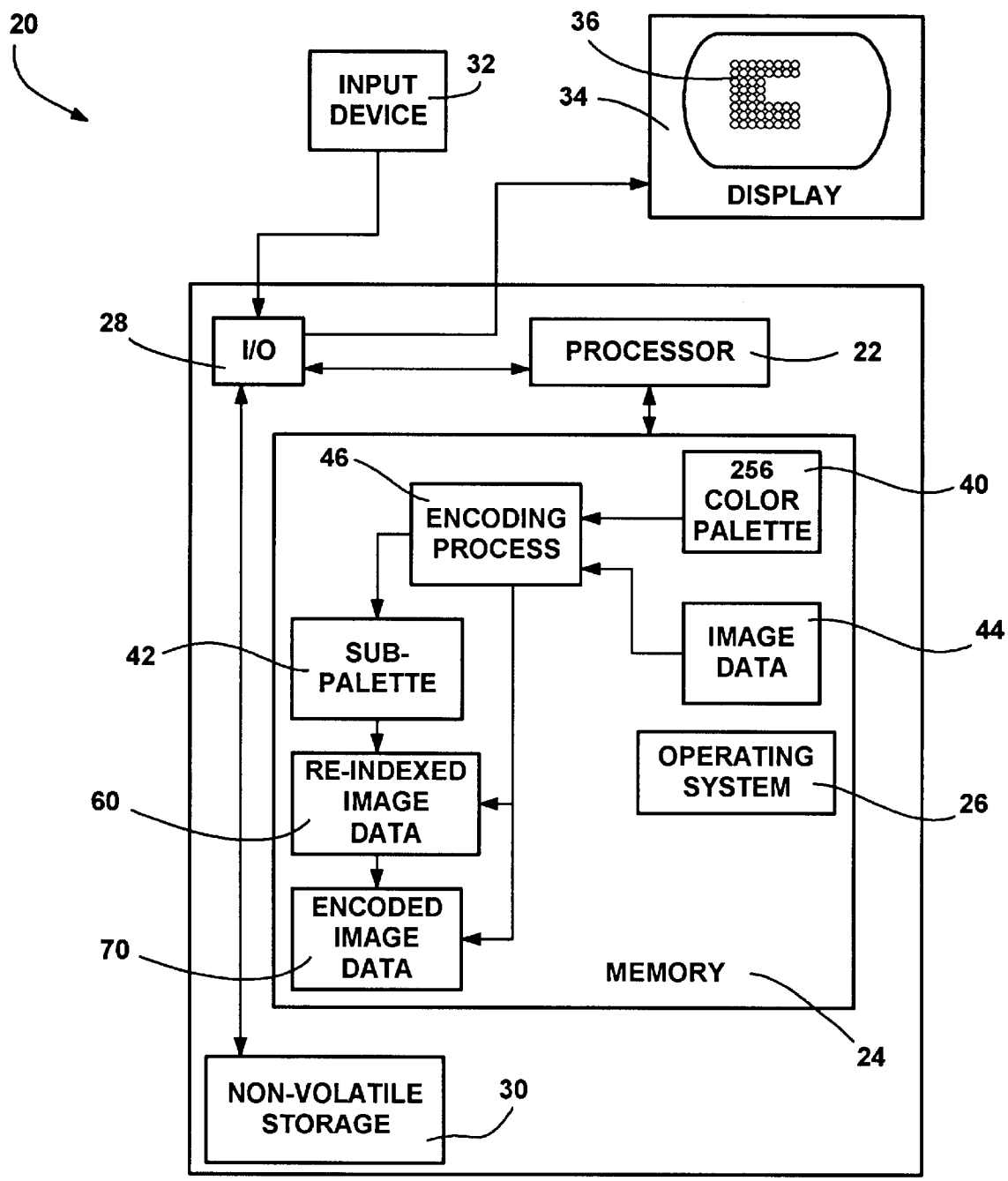
FIG. 1 is a block diagram representing a computer system in which the present invention may be incorporated.

Turning to the drawings and referring first to FIG. 1, there is shown a computer system generally designated 20 into which the present invention may be incorporated. The computer system 20 includes a processor 22 operatively connected to a memory 24 having an operating system 26 loaded therein, and may be a personal computer. As used herein, the memory 24 may include any combination of random access memory (RAM), including conventional RAM and video RAM, as well as read only memory (ROM). The operating system 26 may be virtually any operating system, such as Microsoft Windows® 95, Windows NT™ or the MacOS.

The processor 22 is further connected to input/output (I/O) circuitry 28, through which the processor 22 may write data to a non-volatile storage device 30 such as a hard disk drive. Through the I/O circuitry 28, the system 20 may receive information from an input device 32 such as a keyboard, mouse and/or another computer system. The I/O circuitry 28 also connects the processor 22 to an output device 34 such as a video display device. The output device 34 includes any device capable of presenting an image 36 to a viewer, and although the present invention is primarily directed to video, it can be appreciated that the output device 34 may comprise a printer or the like. However, for simplicity, the invention will be described with reference to video images. Thus, as used herein, an image is any array of pixels, which do not necessarily occupy the entire screen of available pixels. In other words, the total screen display may include a number of smaller images.

As is known, the data representing a displayed color image such as the image 36 ordinarily comprises a data array, with each pixel represented in the array having a particular color value associated therewith. In many computer display systems, the color of each pixel is generated via red, green and blue (RGB) guns, with one byte reserved for the red output level, one for the green output level, and one for the blue output level. Such an RGB system is capable of displaying over sixteen million possible colors. As used herein, where appropriate, the term "color" will mean the actual color of a pixel or the data value representative thereof which will ultimately generate that color. Moreover, where appropriate, the term "color" will also mean "transparent" pixels and the data values representative thereof, as described in more detail below.

To conserve memory, rather than have a red value, a green value and a blue value stored for each pixel, (i.e., "24 bit true color" with at least three bytes per pixel), in one popular color scheme each pixel in an image instead has stored therefor a one-byte index pointer to a 256-color table, or palette 40. Typically, the color palette 40 comprises a 256 by 3 array (FIG. 5), capable of storing up to 256 selected combinations of RGB settings from which the 256 displayed colors may be generated. For example, in the color palette 40 of FIG. 5, a pixel having a color value of 2 points to a setting of 127 red, 0 green and 0 blue. Generally, a setting of 255 is the highest amount of color output, with 0 being completely black, or off. Thus, with the palette 40, each pixel in an image having an index value of 2 stored in association therewith will be displayed as a moderate amount of red. As can be appreciated, for most applications it is sufficient to limit the display 34 to showing only 256 unique colors at a time. At the same time, however, much less memory is required to represent video data with the 256-color palette scheme compared to the 24-bit true color scheme.

In accordance with one aspect of the present invention, the amount of data required to store a typical image is reduced. To this end, the present invention takes advantage of the fact that most individual images that are manipulated on a display contain less than 128 colors, and thus do not require all eight bits of a byte to distinguish each of the colors in the image from one another. In accordance with another aspect of the invention, a reduced color palette, or sub-palette 42 of variable size is established for storing which ones of the colors actually appear in a given image such as the image 36. It should be noted that the present invention is primarily described with respect to the 256-color palette scheme set forth above, although as will become apparent below, the invention will also function with schemes having other-sized palettes. To this end, the present invention is described using eight-bit bytes as the fundamental storage unit for storing color information. However, it can be appreciated that the present invention may be applied to any image having less than or equal to one-half of the colors capable of being stored in a system's fundamental storage unit. For example, if a given system stores color information in 16-bit words, 65,536 unique colors may be present. If an image has less than or equal to one-half of this number, i.e., 32,768 colors or less, the color may be described in 15 bits or less, saving one or more bits. Indeed, as described below, the present invention functions with virtually any color scheme including 24-bit true color, provided the image is composed of less than or equal to half of the number of colors which may be stored in a fundamental unit.

To compress the image data 44, such as data representing the C-shaped image 36, an encoding process 46 (FIG. 1) is provided. The image data 44 may be in the memory 24 or initially stored in a file in non-volatile storage 30, and may be initially stored in any format, including compressed formats. Regardless of how the image data 44 are actually stored, the encoding process 46 effectively recognizes the image as an array of data bytes $50_{00}$–$50_{77}$ as shown in FIG. 3 (representing the actual pixels $52_{00}$–$52_{77}$ of FIG. 2).

Figure 2:
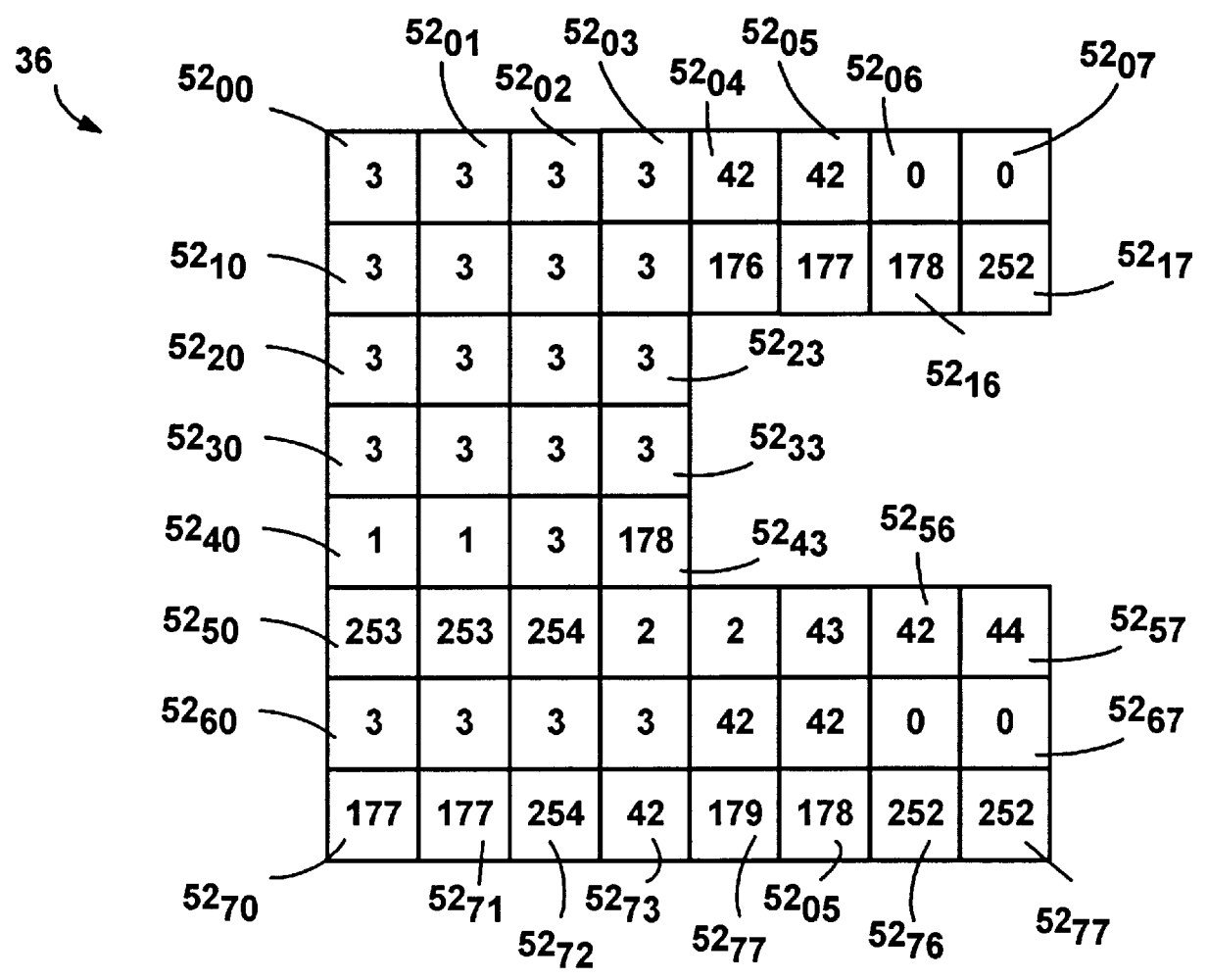

For purposes of the present example, the image data 44 shown herein has one color-identifying byte per pixel according to the 256-color scheme as generally shown in FIG. 3. Note that for programming purposes, image data is ordinarily stored as full rectangular-shaped images, with "transparent" pixel values (set equal to 255) filling in any holes or gaps in an image. Thus, although the actual image 36 is effectively C-shaped as shown in FIG. 2, the image data 44 is a full eight-by-eight array having a value of 255 wherever a pixel is not present with respect to a rectangularized image. Accordingly, as shown in FIG. 3, the data values $50_{24}$–$50_{27}$, $50_{34}$–$50_{37}$, and $50_{44}$–$50_{47}$, (which represent "missing" pixels $52_{24}$–$52_{27}$, $52_{34}$–$52_{37}$, and $52_{44}$–$52_{47}$, respectively), equal 255.

Figure 14A:
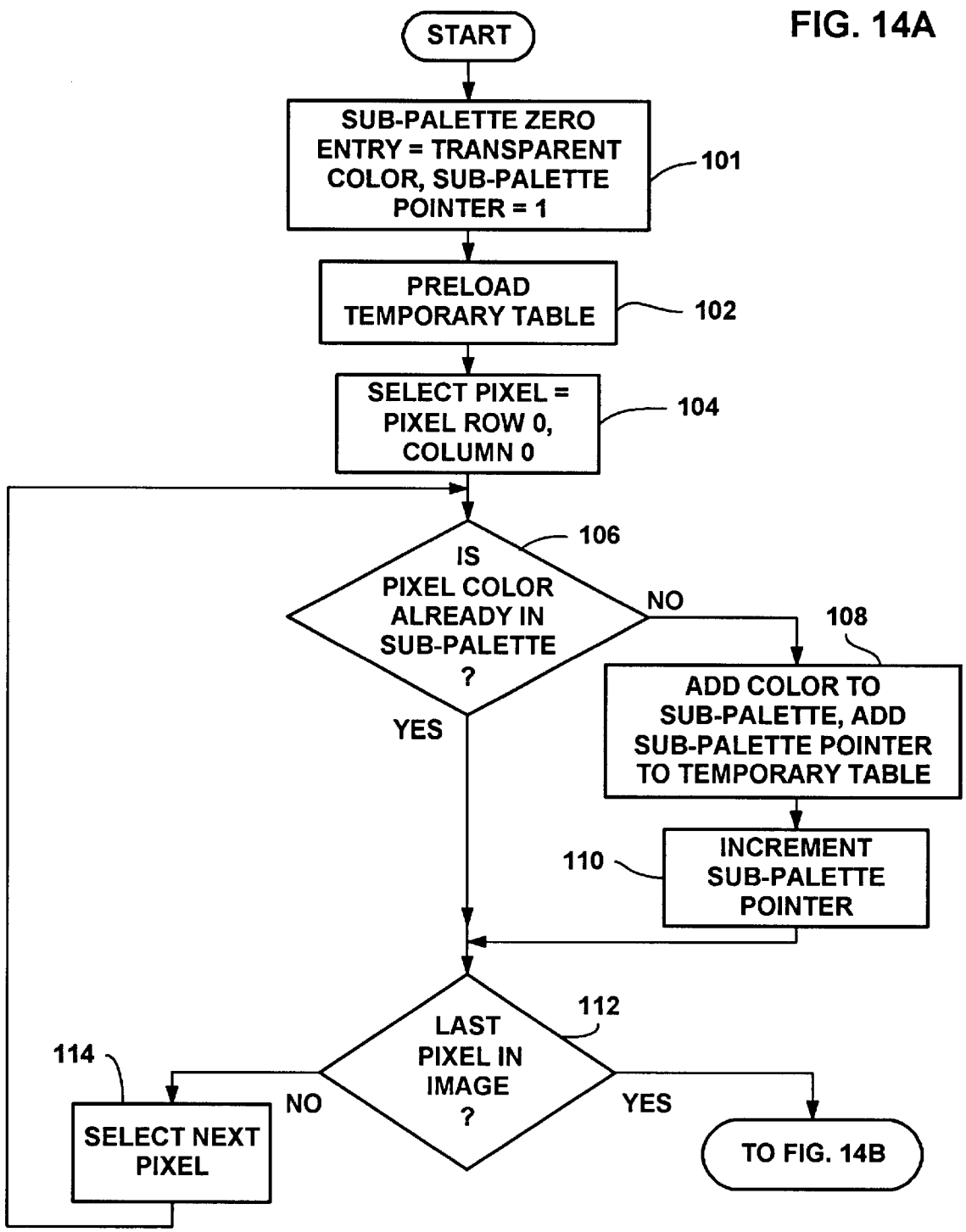
Figure 14B:
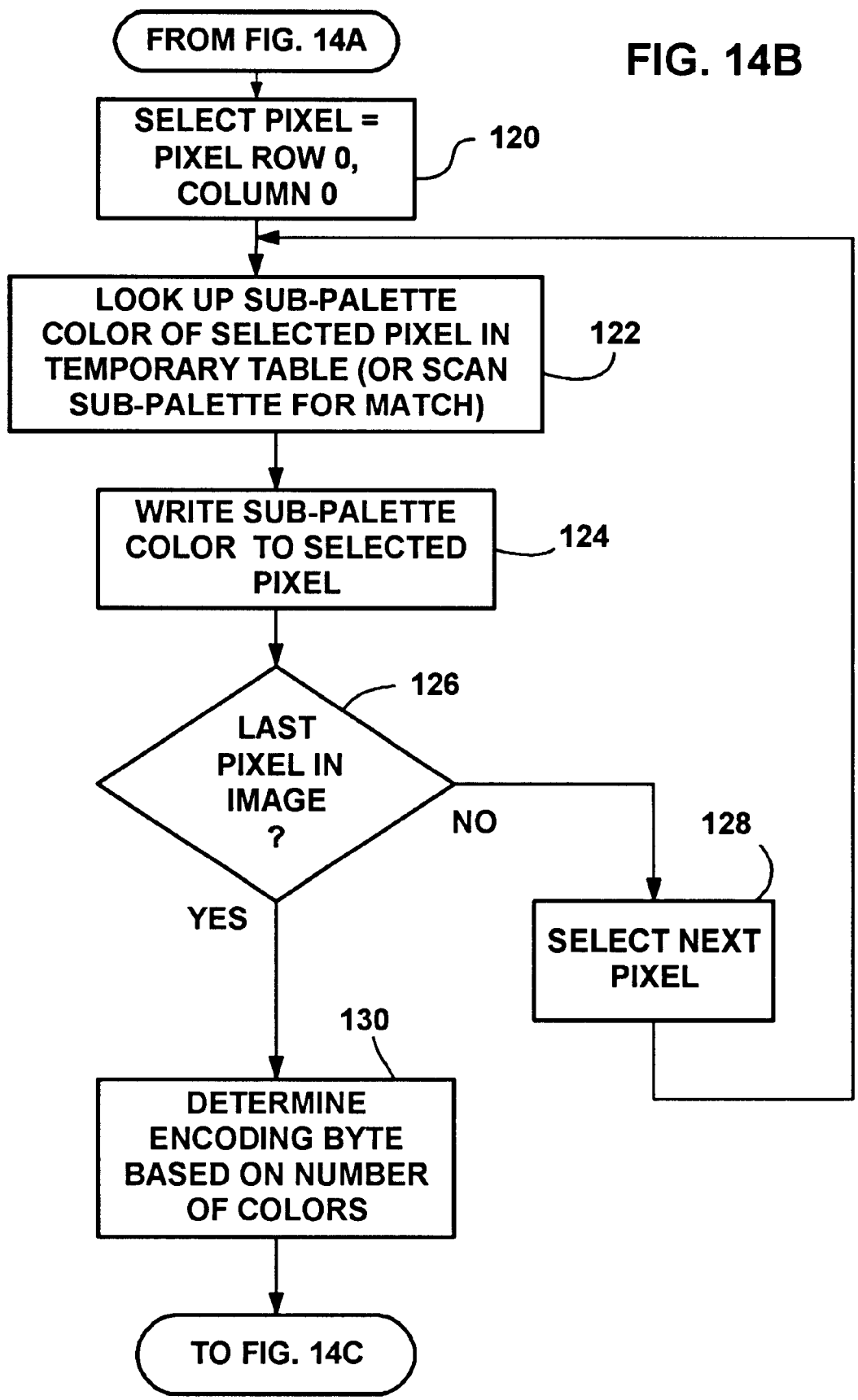

Turning to an explanation of an operation of the invention with particular reference to the flow diagram of FIGS. 14A–14C, the encoding process 46 begins at step 101 with an initialization step by setting the zero entry in the sub-palette 42 (FIG. 6) equal to the transparent color value of 255. Although not necessary to the invention, most images are not perfectly rectangular, and the data representing such images thus includes representations of transparent pixels as described above. As will be described below, a transparent pixel is a special case which benefits from having a constant sub-palette index pointer assigned thereto. Thus, as shown in FIG. 6, the first byte (byte zero) in the sub-palette array 42 is set to 255, and the sub-palette pointer or the like is set to one to point to the next byte location.

Another initialization step, step 102, pre-loads a temporary table 56 (FIG. 7) with values which do not correspond to valid sub-palette indexes, as described in more detail below. Next, the data byte $50_{00}$ in the image data 44 (representing the first pixel $52_{00}$ of FIG. 2) is selected at step 104.

Figures 6, 7, 8:
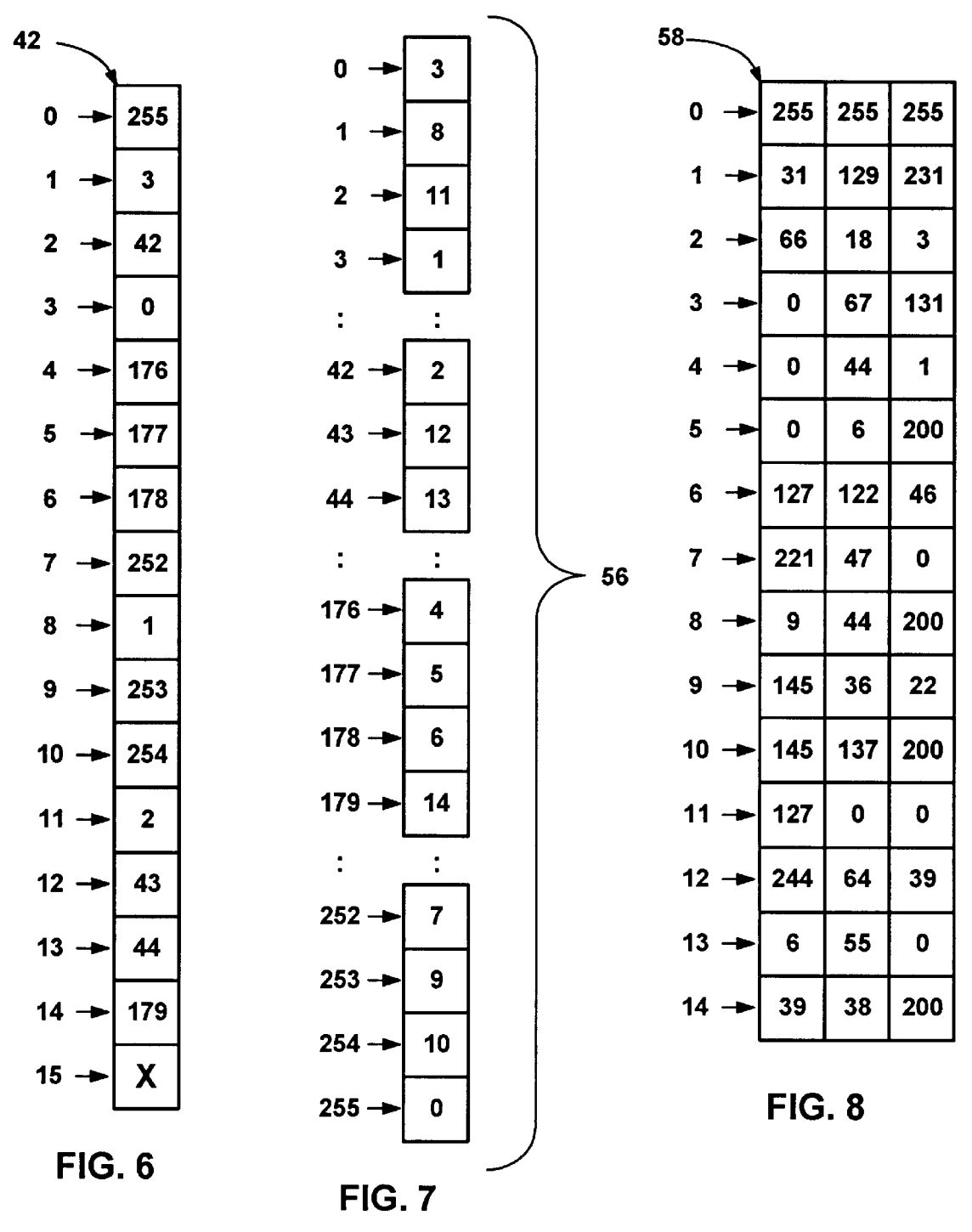

The encoding process 46 then begins to scan through the image data 44 for the purpose of constructing the reduced sub-palette array 42 (FIG. 6). Since the sub-palette array 42 being filled in represents a color table of distinctive colors, there is no reason to duplicate an already-entered color. Accordingly, in the situation wherein the colors are stored in the 256-byte color scheme such as shown in FIGS. 2 and 3, a simple way to determine whether a color has been already added to the sub-palette table 42 is to originally pre-load the temporary table 56 (FIG. 7) with a predetermined value, (which will not be a valid value in the sub-palette 42 of FIG. 6), and then test whether a valid value has overwritten the predetermined invalid value. Note that zero is an acceptable number for pre-loading the temporary table 56, since zero will only be used in conjunction with the special transparent color of 255, and testing need not be done on 255 since 255 is already at offset zero in the sub-palette 42. Another way to determine if a color has been already added to the sub-palette 42 is to scan the sub-palette 42 for the existence of the color value in question.

Thus, at step 106, the color of the data value $50_{00}$ (pixel $52_{00}$) is examined, and if the pixel $52_{00}$ has a color that is not stored in the sub-palette index 42, then step 106 branches to step 108. Since the pixel $52_{00}$ is the first pixel having a color of 3, at this time the temporary table 56 does not have a valid entry therefor, and thus color 3 has not been entered into the sub-palette 42. Accordingly, at step 108 the color (equal to 3) is added to the sub-palette 42 at an offset index of one byte, as shown in FIG. 6. In addition, an entry is also made into the temporary table 56 (FIG. 7) using the color 3 as the index and the sub-palette index pointer of 1 as the entry. In other words, the temporary table 56 is the reverse of the sub-palette array 42. Since any of the 256 possible colors may appear in a given image, space is allocated in the temporary array 56 for the full 256 bytes even though not all entries will be filled. At step 110, the sub-palette pointer is incremented so that the next distinct color will be entered in the sub-palette 42 at an offset of two.

Next, at step 112, a test is performed to determine if the image data 42 has been fully scanned, that is, whether the previously-tested pixel value is the last pixel in the image data 44 (e.g., pixel value $50_{77}$). Since other pixels have not been tested at this time, the encoding process 46 branches to step 114 where the next pixel value $50_{01}$ (representing pixel $52_{01}$) is selected before returning to repeat the testing at step 106.

This time through the loop, however, the pixel value $50_{01}$ has a color of 3 which already is in the sub-palette table 42. Note that this is quickly determined by accessing the temporary table 56 with an index of 3 and obtaining a valid (e.g., non-zero) sub-palette index pointer of 1. Accordingly, the encoding process 46 skips over the color-adding steps and instead immediately branches to step 112 to determine if more pixel data is present.

As is understood from following steps 106–114 of the flow diagram of FIG. 14A with respect to the image data 44 of FIG. 3, the next color value added at step 108 to the sub-palette 42 (FIG. 6), with an index pointer of 2, is color 42 of pixel value $50_{04}$. As before, at step 108 the temporary array 56 (FIG. 7) also stores, in reverse, the value 2 at an offset of 42. As steps 106–114 repeat, the remaining image data 44 of FIG. 3 is scanned in a like manner, and the sub-palette array 42 and the temporary array 56 are filled in as shown in FIGS. 6 and 7, respectively. Ultimately the data byte $50_{77}$ is tested, and at step 112 the encoding process 46 continues to step 120 of FIG. 14B. As can be appreciated, there is no required order to the colors being added to the sub-palette 42, and thus distinct colors are simply added to the table 42 as found in the image data 44.

It should be noted that a sub-palette 58 as shown in FIG. 8 (which is similar to the sub-palette 42 of FIG. 6) may be generated for the 24-bit true color image data 59 of FIG. 4. Note that in FIG. 4 a transparent pixel is represented by RGB bytes equal to 255, 255, 255. However, with 24 bits per color, providing a similar temporary table would require over 16 megabytes of space. Accordingly, rather than use a temporary table, at step 106, the sub-palette 58 (FIG. 8) instead may be scanned for the presence of an already-existing color entry for a given color. Of course, step 108 does not add an entry to any temporary table in such an instance.

Regardless of the original data format, at this time an appropriate sub-palette such as the sub-palette 42 of FIG. 6 is complete, and the total number of colors in the image 32 is known from the size of the sub-palette table 42. In the present example, 15 colors (including the "transparent" color 255) are present. So that the size of the sub-palette 42 is proportional to a bit count, the sub-palette 42 may be rounded up to the next power of two, i.e., a size of 16 bytes ($2^4$) in the present example. If rounding is performed, any extra bytes are unused, e.g., as shown by the "X" in FIG. 6. In the event that the number of colors exceeds 128, the process 46 may effectively end. Of course, before ending the process can take any necessary steps to indicate to future processes or the like that the image data has not been compressed according to the present invention.

Figure 9:
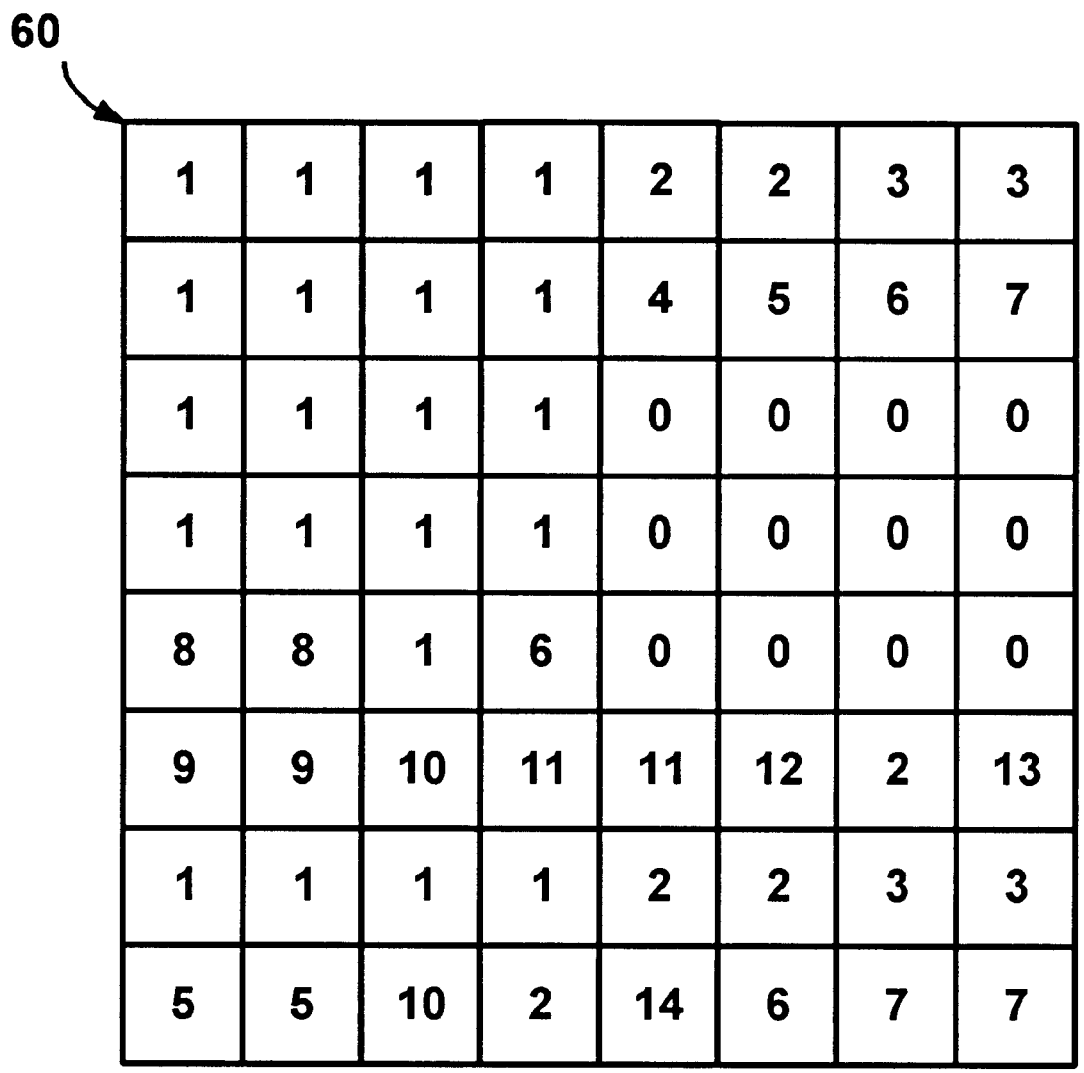
FIG. 9 is a representation of a data array used to store the pixel image information of FIG. 2 after having been re-indexed with the values in the reduced-color sub-palette of FIG. 6.

In the frequent situation where less than 128 colors are in an image, the image data 44 is re-written, as generally shown in the re-indexed image data 60 of FIG. 9, to reference the colors of the sub-palette 42 rather than the 256 colors of the main color palette 40. FIG. 14B shows how this task is performed through the use of the temporary table 56 when dealing with the 256 color image data 44 of FIG. 3.

At step 120, the data byte $50_{00}$ representing the first pixel $52_{00}$ is selected, and at step 122 the new sub-palette color value therefor is looked up in the temporary table 56 (FIG. 7). Alternatively, the sub-palette color value can be found at step 122 by scanning the sub-palette 42 for a match. Note that if the image data was originally represented in the 24-bit true color scheme, such scanning finds a match with the corresponding three-byte color representation in sub-palette 58 without the need for a temporary table such as the table 56. In any event, the corresponding value in the appropriate sub-palette 42 (or 56) is located and used to build an array of new image data 60 as shown in FIG. 9. Alternatively, but less preferably, the re-indexed values may directly overwrite the existing image data 44. In the present example, pixel $52_{00}$ originally has a color of 3, which is used as an index to the temporary table 56 to find the new color of 1 in the sub-palette 42. Thus, in FIG. 9, pixel value $62_{00}$ is set to a color of 1.

Step 126 checks to determine if all pixel values have been re-indexed in the above manner. If not, the next pixel value ($50_{01}$) is selected at step 128 and the process returns to step 122 to rewrite the re-indexed value into pixel value $62_{01}$. Note that the steps of FIG. 14B may actually be integrated into the steps of FIG. 14A, since as a given pixel is tested for purposes of building the sub-palette 42, that pixel may be immediately re-indexed based on the sub-palette color assigned (if new) or matched (if already in the table 42) therefor. However, it is not significant how the re-indexing occurs, and it is logically convenient to describe the process as first building the sub-palette 42, and then re-indexing the image data 44 into the image data 60 using the completed sub-palette 42.

In accordance with another aspect of the invention, once the original color image data 44 (FIG. 3) has been converted to the re-indexed color image data 60 (FIG. 9) via the 15 color sub-palette 42, the re-indexed color values $62_{00}$–$62_{77}$ are compressed according to the number of bits necessary to distinguish each color from one another. In other words, if there is a total of 1 or 2 distinct colors (including transparency), at least 1 bit is required, if 3 or 4 colors, 2 bits, and so on up to 128 colors requiring 7 bits. In the present example there are 15 colors, and thus four bits are used to distinguish the colors from one another. Step 130 (FIG. 14B) determines how many bits are used for the color value.

At this time, the image data can be compressed based upon the reduced number of bits needed to represent the distinct colors. For example, if sixteen colors are in an image, at least four bits are required to associate each distinct color with a distinct bit pattern, and thus as many as two pixels may be represented per byte. Similarly, if 64 colors (6 bits) are present in an image, four pixels (24 bits) can be stored within three bytes. All that need be maintained with the pixel data is a bit count identifier and the sub-palette so that a decompression process knows how to reconstruct the original pixel data.

However, it is preferable to use the bit savings with a more optional compression scheme. Thus, according to another aspect of the invention, after the color bits are placed within a specified location within a byte, the remaining bits are used to store how many times a given color appears consecutively, i.e., a run length of contiguous colors. Since a run length of zero is nonsensical, the actual bit value stored is one less than the run length being represented. Thus, a run length of zero represents one pixel, a one represents two consecutively-colored pixels, and so on, up to the maximum run length that can be stored in the remaining bits.

FIG. 14C shows the general steps taken to compress the re-indexed image data 60 into byte-compressed image data 72. The byte-compressed data 72 is composed of a series of bytes $74_0$–$74_n$ with each byte comprising one or more bits of run length and one or more bits of colors. At step 140 of FIG. 14C, the re-indexed data byte $62_{00}$ (FIG. 9) representing the first pixel (row pointer 0, column pointer 0) is selected, a run length counter therefor is set to zero, and a first byte $74_0$ is set equal to byte $62_{00}$'s re-indexed pixel color of 1 (0000 0001B, where "B" represents binary). At step 142, the column pointer is tested to determine if its value indicates the last column in the image, i.e., column 7 in the present example. At this time the column pointer equals 0, so at step 142 the process branches to step 144 where the column pointer is incremented, followed by step 146 where pixel value $62_{01}$ is selected based on the row (0) and column (1) pointers.

Step 148 follows, and tests to determine if the (re-indexed) color of pixel value $62_{01}$ is the same as the color of the previous pixel in the row, pixel value $62_{00}$. As best shown in FIG. 9, both pixels values are equal to a re-indexed color value of 1 and as a result the process branches to step 150. Next, step 150 tests to determine if the current run length is at the maximum possible run length as determined by the number of bits available therefor. In the present example, four bits are available, and thus the maximum run length is 16 decimal (actually $2^4-1$ or 15 decimal, since as previously described, the run length herein is one higher than its binary representation). At this time the current run length is zero, so step 150 branches to step 152 where the run length counter is incremented. As is understood from following steps 142 to 152 for pixel values $62_{00}$–$62_{03}$ of FIG. 9, the run length counter is incremented to 3 for the first four contiguous colors equal to 1.

Figure 10:
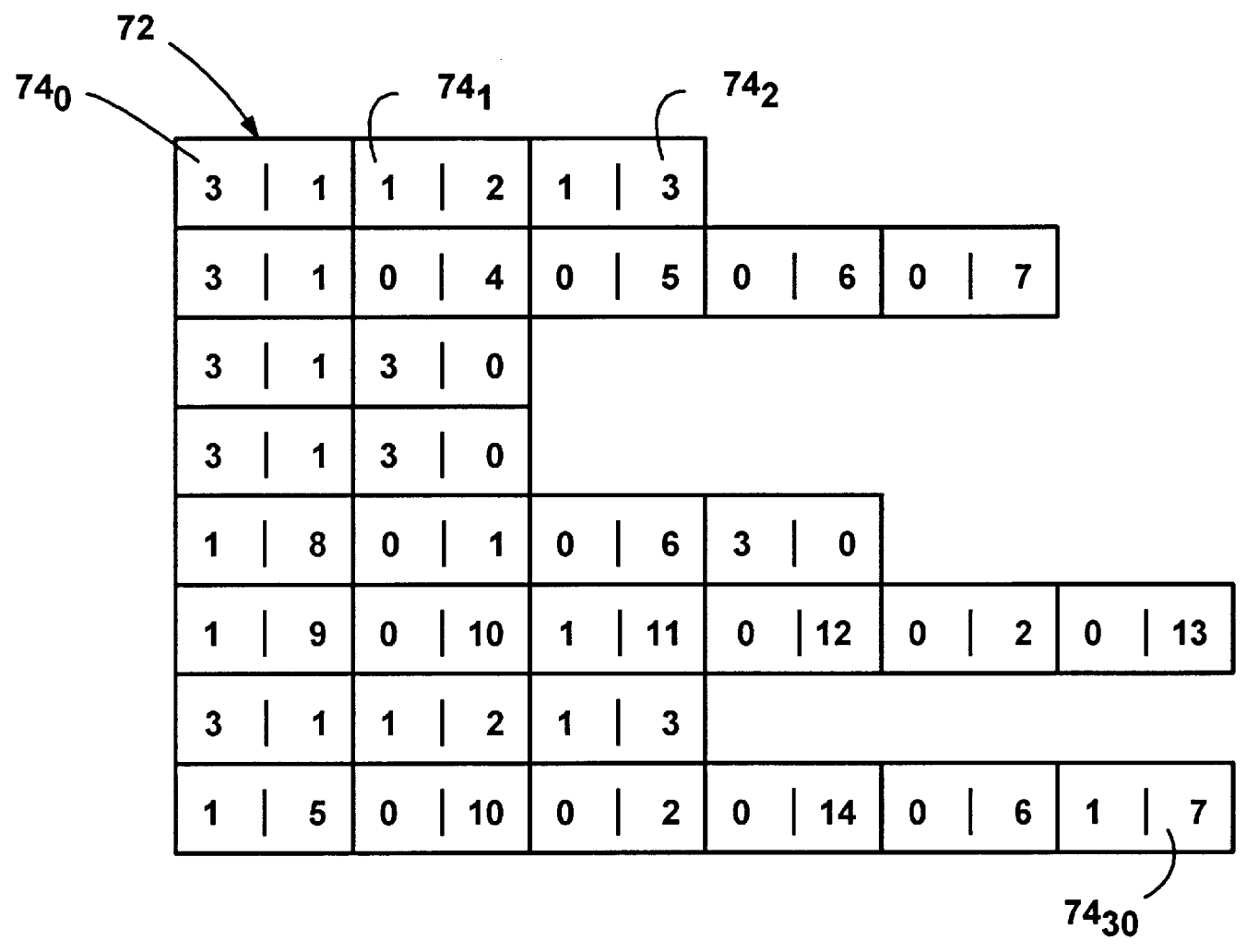

However, when the value for re-indexed pixel value $62_{04}$ is encountered, step 148 determines that the color of 2 does not equal the previous color of 1. Accordingly, step 148 branches to step 154 where the run length is combined with the color value and stored in the byte $74_0$. Since the run length is stored at the high order bits, one way to combine the run length value of 3 (0000 0011B) with the color value of 1 (0000 0001B) is to shift the run length left an appropriate number (i.e., four in the present example) of bits (0011 0000B) and OR the shifted run length with the color value byte, resulting in byte $74_0$ equal to a run length of 3 for color 1 (0011 0001B). Thus, as shown in FIG. 10, wherein the run lengths are shown separate from the color bit patterns for purposes of readability, the first byte $74_0$ has a run length of 3, color of 1. As a new byte is started for the new color, the run length counter for the new byte is reset to zero.

Accordingly, a second byte $74_1$ having a color of 2 is started, beginning with a run length of zero. From following the steps 142–152 of FIG. 14C in conjunction with the re-indexed image data 60 of FIG. 9, it is understood that the byte $74_1$ will ultimately be stored with a run length 1 for a color of 2 (0001 0010B), and the byte $74_2$ will have a run length of 1 for a color of 3 (0001 0011B).

In one alternative embodiment, the data may be compressed such that there is no distinction between the end of a row and the beginning of the next row. Upon decompression, the number of pixels in a row is known and the decompression process merely starts a new row when the number of pixels that complete each row is reached. However, in a preferred embodiment, the end of a row completes an encoded byte even if the same color begins the next row, i.e., the new row starts with a new byte as if a new color is encountered. As will be described below, this facilitates still further compression of the data. Moreover, this facilitates indexing to the beginning of a row, and, if an image needs to be updated because an object with transparency moves over it, a number of rows may not require access.

To end a run at the end of a row, the encoding process 46 eventually reaches a point wherein the column pointer is at the last column (seven) at step 142. In such an instance, the row pointer is tested at step 156 to determine if the row pointer is also at the last row. If so, this portion of the encoding process 46 would be complete. However, in the present example another row is available, so step 156 branches to step 158 where the row pointer is incremented (to 1). At step 160 the column pointer is reset to column 0, and thus the first pixel value $62_{10}$ of the next row, having a color of 1, is selected. At step 154, the previous encoded byte $74_2$ has its color and run length combined and preserved, the run length counter is reset, and a new byte $7_{23}$ is set equal to the color of 1.

By following the steps of FIG. 14C for the remaining pixel values $62_{10}$–$62_{77}$, it is seen that FIG. 10 shows how the image data 60 of FIG. 9 is represented in a compressed byte format. As discussed above, the high bits are reserved for the run length and the low bits for the color, and FIG. 10 shows each byte with a split between the run length and the color value. To enhance readability, FIG. 10 also shows a distinction between rows, although the bytes $74_0$–$74_{30}$ may be contiguous since the run lengths or offsets may be used to differentiate rows. To summarize, in FIG. 10 the first byte $72_0$ (0011 0001B, actually 49 decimal) represents four contiguous pixels (three plus one) with a sub-palette color of 1, the next byte $70_1$ is a length of 2 (one plus one), sub-palette color of 2, and the third byte $72_2$ is a length of 2 (one plus one), sub-palette color of 3. As can be appreciated, at this time the entire first row of eight pixels $62_{00}$–$62_{07}$ is represented by only three bytes, $72_0$–$72_2$.

In the above example each byte is coincidentally split into two, four-bit nibbles, however this is only because four bits were necessary for representing the colors. As can be appreciated, other splits are likely, and indeed, the preference is to use only as many bits as necessary for the color and thus maximize the bits available for the run length. Thus if only four colors (requiring two bits) are present in a given image, the split is six bits for the run length, two for the color. Note that in such a situation the re-indexed image data of FIG. 9 would have only values zero through three therein.

Moreover, although not directly apparent from the above example, if the number of contiguous colors exceeds the maximum run length that its allotted bits can store, 16 in the present example, then a new encoding byte is provided (as if the next pixel had a new color). Note that this is tested for at step 150 of FIG. 14C, which branches to step 154 to store the existing byte and provide a new byte when the maximum run length is achieved. Although such a situation only occurs when an image's rows are longer than the maximum run length therefor, with typical images this is likely. For example, if the present 15-color example had longer (e.g., 50 column) rows and color one appeared forty-three times consecutively in a given row, step 150 would branch such that three bytes would be ultimately provided for the 43 contiguous colors, length 16, color 1; length 16, color 1; and length 11 color 1 (1111 0001B, 1111 0001B, 1010 0001B).

Although not necessary to the invention, for still further compression the compressed bytes $74_0$–$74_{30}$ may be logically grouped into rows referenced by a row (offset) pointer. The use of row pointers enables the data bytes of identical rows to be eliminated and referenced by a single row pointer. Thus, as shown in FIG. 11, only the six distinct rows of the eight rows shown in FIG. 10 are preserved in row source data 76, and identified by offset pointers to rows R0–R5.

Moreover, to speed decompression and further reduce the size of the encoded data 70, any transparent pixels at the start of a row and/or at the end of a row may be effectively skipped over. Skipping transparent pixels is accomplished by providing a length (16-bit word) value 77 at the start of each row followed by a skip number 78 of transparent pixels at the beginning of a row. If the entire row is to be skipped, i.e., is transparent, the length value 77 is zero. At present, the skip number 78 is stored in a byte, but may be represented in some other unit of storage such as a word. Each length word 77 provides a count of the number of bytes in its respective row in the row source data 76, including one byte for the skip number but excluding trailing bytes for transparent pixels ending a row since such pixels will not be written. Indeed, as shown in FIG. 11, bit-compressed bytes representing transparent pixels at the end of a row (such as rows R2 and R3) are preferably removed from the row source data 76. As can be appreciated, the compression and decompression processes benefit from the consistency of having a predetermined number, zero, represent the transparent pixels in this scheme, and since most processors have a simple zero test.

Thus, although not shown in FIG. 14C for purposes of simplicity, it can be appreciated that such detection of transparent pixels (color of zero) at the start and end of each row is a relatively uncomplicated task. For example, during the encoding process described above, each time the column is at zero, (step 140 or step 160 of FIG. 14C), transparencies at the beginning of a row may be first counted and stored in the skip number 78. Likewise, although not shown in FIG. 14C, once the last column of any row is detected by step 142, transparent pixels from the end of a row are removed and the length counter 77 reduced for that row a corresponding amount (to zero if the entire row is transparent).

Upon decompression, the byte count in a given row is immediately known from length 77, and the starting non-transparent pixel may be determined from the skip number 78. Note that if more than 256 transparent pixels start a row of an image, the additional starting transparent pixels are represented like other colors in the image having run lengths and a color (zero) therefor. Of course, no color is written to the memory 24 for pixels designated as transparent whenever transparent runs are encountered.

As can be appreciated, the encoded image data 70 essentially may be represented by the row offset pointers, in the order of the rows, R0, R1, R2, R2, R3, R4, R0 and R5, in conjunction with the row source data 76 of FIG. 11 and the sub-palette 42 (FIG. 6). Accordingly, the encoded image data 70 includes such additional information as necessary to decompress the compressed image data 76.

Figure 12:
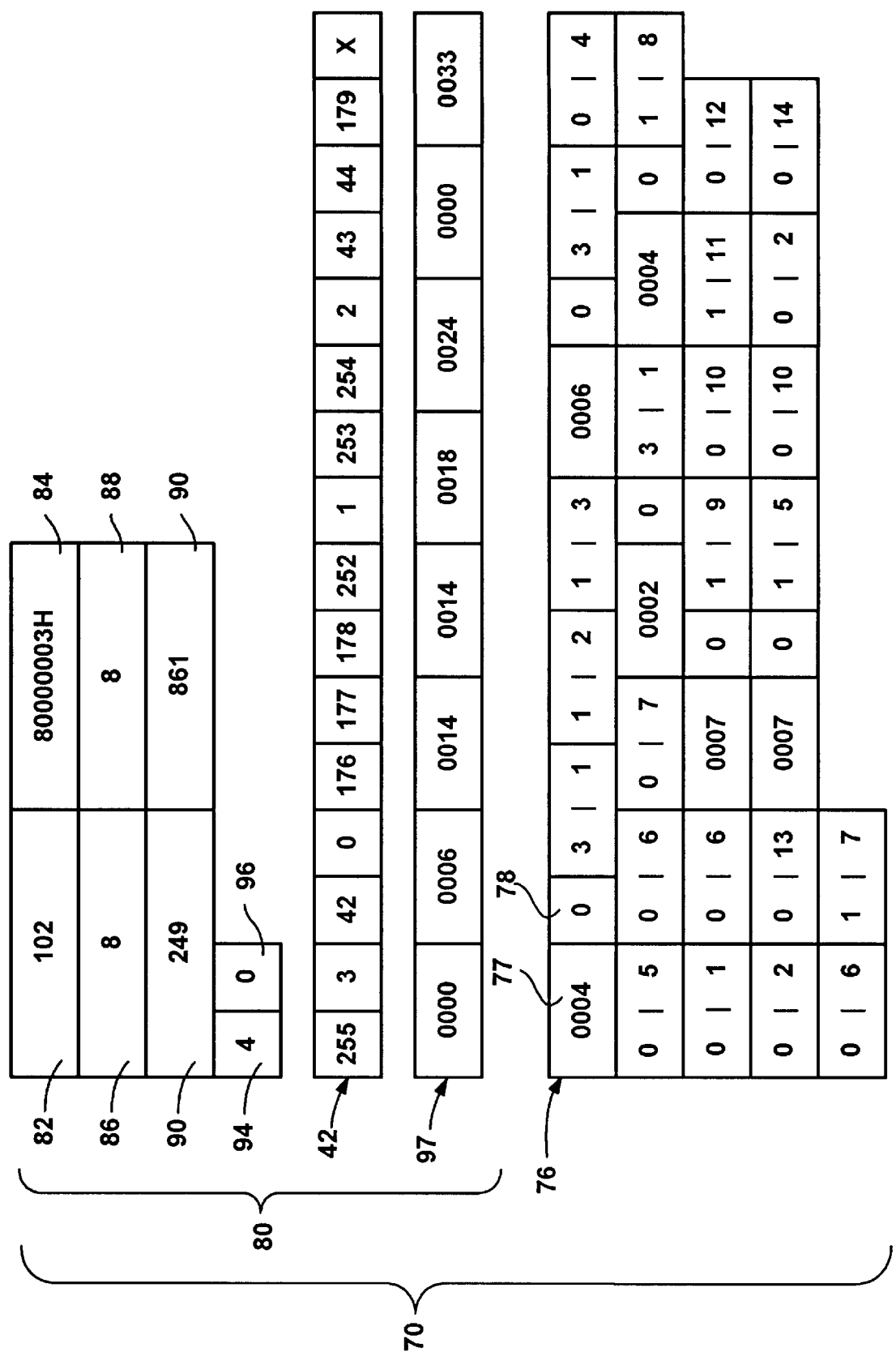
FIG. 12 is a representation of a data structure for storing the compressed image of FIG. 2.

As shown in FIG. 12, the additional decompression information is stored in a header 80 associated with the compressed image data 76. The header 80 includes six, data type long, values including a count 82 indicative of the number of bytes in the pixel data, and a compression type indicator 84 having a value of 80000004 hexadecimal signifying the variable run length type of compression described herein. The header 80 also includes a width value 86 (equal to eight) and height value 88 (equal to eight) of the final image, and x and y registration points 90, 92 for placing the image 36 at runtime as specified by the author. These first six long values are common to other types of compression schemes, with a unique compression type indicator 84 for each scheme. As such, the count value 82 does not include these first six long values in its total.

In keeping with one aspect of the present invention, the header 80 maintains an encoding byte 94 (created at step 130 of FIG. 14B) indicative of how the encoded bytes 76 are divided into bits of run length and color values. In addition, the encoding byte 94 provides the size of the sub-palette 42. Thus, in the above-described example, the value of the encoding byte 94 equals four, indicating that the four least significant bits of the encoded bytes 76 represent the color, (and thus the four most significant bits represent the run lengths thereof), and the size of the sub-palette array 42 is sixteen bytes in length, i.e., $2^4$. As described above, not all sixteen bytes are necessarily used in the sub-palette array 42. To maintain the appropriate colors, the sub-palette array 42 is also stored in the header 80.

Following the sub-palette array 42, the last block of data stored in the header 80 is a series of row pointers, or offsets (stored as sixteen bit words) 97, each offset pointing to the start of a row of compressed image data. Note that for smaller images, 8 bits may be used, while for large images more bits (e.g., 32 bits) may be alternatively used for the offsets 97. However, 16 bits is a reasonable compromise for most images. As shown in FIG. 11, row R0 of the reduced row source data 76 starts at an offset of 0 (bytes), row R1 at an offset of 6, row R2 at an offset of 14, and so on through row R5 beginning at an offset of 33 bytes. Note that as shown in FIG. 10, the rows in the compressed bytes 72 are actually ordered R0, R1, R2, R2, R3, R4, R0 and R5, corresponding to offsets in the row source data 76 (FIG. 11) of 0, 6, 14, 14, 18, 24, 0 and 33 respectively.

However, while using 16-bit words as row data offset pointers generally saves space with many images, only offsets having values less than 64 KB would be possible. To eliminate such a limitation, there is provided an alignment byte 96 which effectively allows the offsets to be divided by a power of two as necessary to fit the 64 KB maximum word value. Bytes are padded to the end of rows as needed to maintain the alignment.

Figure 13:
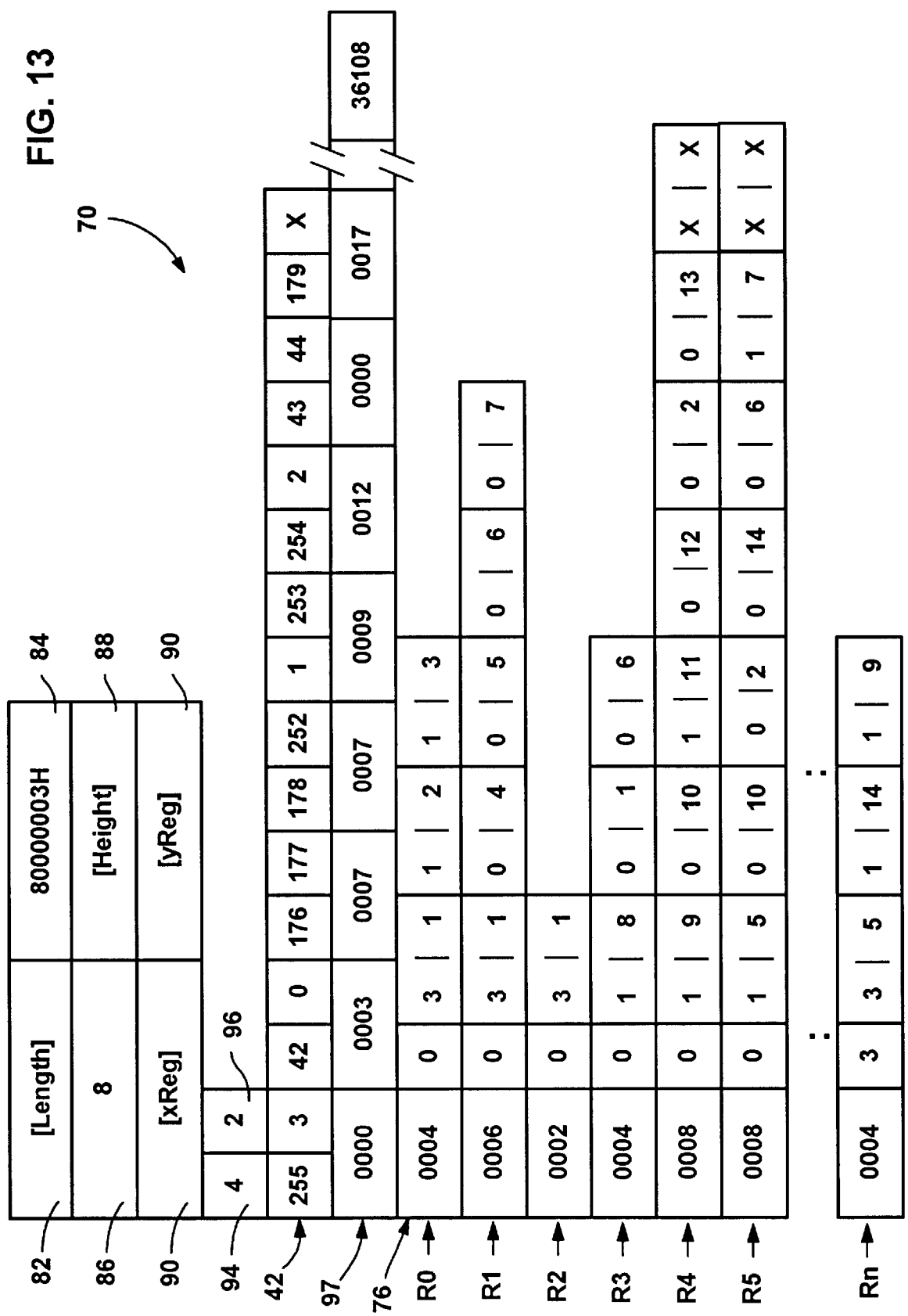
FIG. 13 is a representation of a data structure for storing a compressed image having a row offset pointer greater than 64 KB.

By way of example, FIG. 13 shows a situation wherein the last row offset, pointing to the start of row Rn, would equal 72,216, but for the 64 KB limitation. Note that for purposes of readability, the row source data 76 of FIG. 13 is shown separated by rows. In FIG. 13, the alignment byte 96 is set to one, and thus all offset values are actually stored after having been divided by two, i.e., shifted right $2^1$ where the exponent is the value of the alignment byte 96. Thus, when an offset of 0003 is selected for row R1, it needs to be shifted left one bit so that it actually points to 0006. The last offset is stored as 36,108, which fits into the 64 KB maximum word value. As can be appreciated, the alignment byte 96 equals one when the last row offset is between 64 KB and 128 KB minus one.

As previously mentioned, to keep rows aligned with pointers that are actually double their number, rows having odd numbers of bytes are padded so that they are evenly divisible by two. Accordingly, each of the rows R4 and R5 of FIG. 13 has an extra byte added thereto. As a result, the 34th byte starts R5 and the offset of 0017 decimal, shifted left once, properly points to the start of R5.

Still larger last-row offset values are handled in the same manner. For example, when the last row offset is between 128 KB and 256 KB minus one, the alignment byte 96 equals 2, whereby the offsets 97 actually point to four times their stored values, i.e., $2^2$. As is understood, in such an instance rows are padded as necessary so as to be exact multiples of four bytes.

Although in the described example the compression does not actually save many bytes, typical larger images having many repetitive rows can significantly benefit from this additional optimization. Indeed, file sizes that are three to thirty percent of the original uncompressed image files have been obtained using the above-described compression scheme.

Moreover, it is contemplated that several compression schemes may be separately applied to image data, with the best available scheme, if any, selected for a given image. Selection of a given scheme will be based on resulting size with consideration given to the speed of decompression. Note that in general, time is not a significant factor when compressing the image data, as the image data is typically written to non-volatile storage 30 for later decompression and viewing by a user other than the author. Thus any optimizations which further reduce the total size of the encoded image data 70 and/or the speed of decompression are also desirable. For example, other compression techniques such as those that look for repetitive patterns among the encoded image data 70 may be subsequently applied to further compress the image data.

Lastly, a single image may be represented in various colors by varying only the sub-palette associated therewith. For example, the difference between a red circle and a blue circle are the RGB values that the sub-palette entries in the image data actually point to. Thus, an image can be associated with multiple sub-palettes, whereby each image and sub-palette pair forms a new instance of an image that can be displayed. As can be readily appreciated, such a pairing provides a rapid and useful tool for displaying changes to images. For example, an icon image can change its color when selected and change back when no longer selected simply by changing the associated sub-palette in accordance with the change in state.

Figure 15:
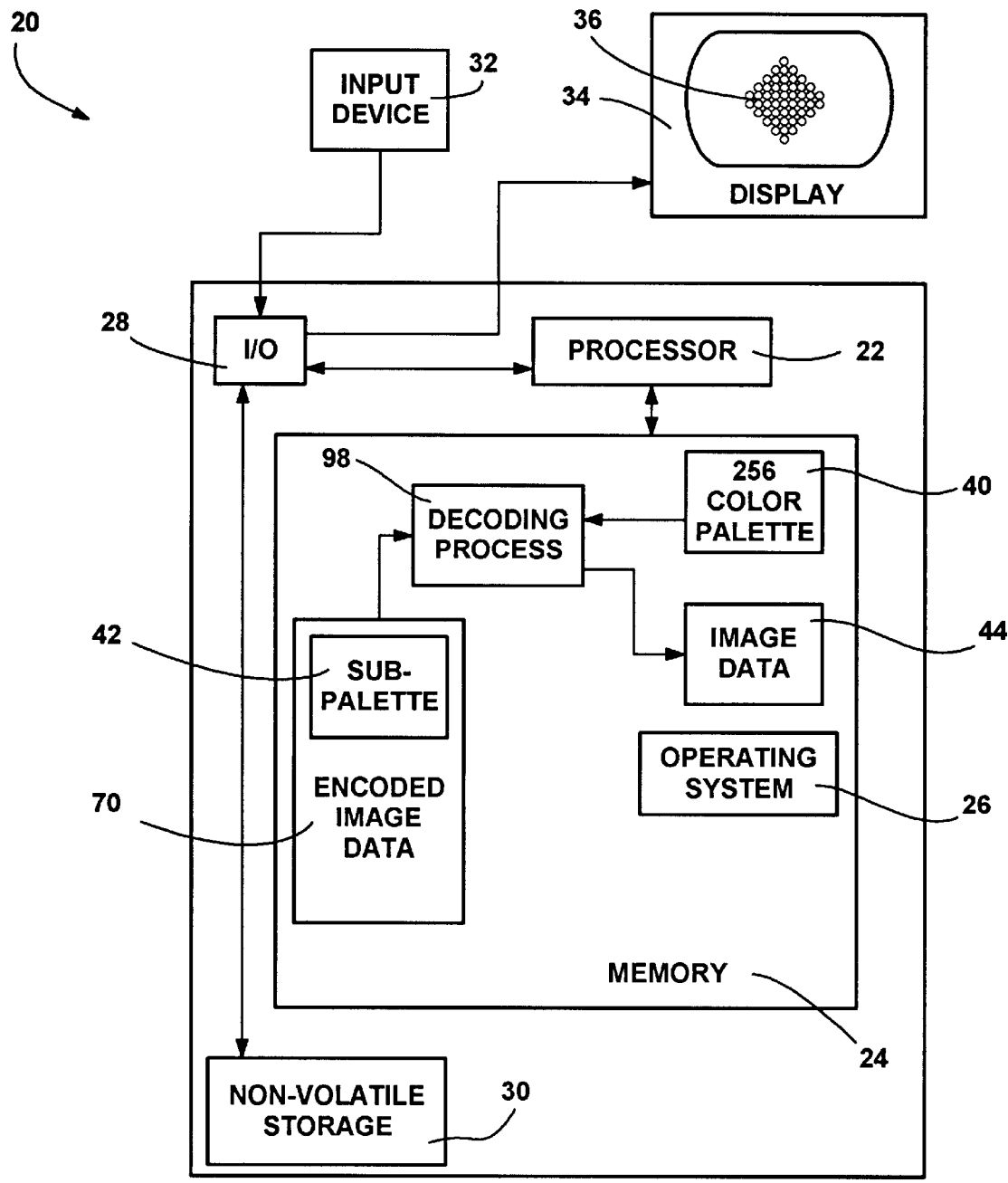
FIG. 15 is a block diagram representing a computer system in which the decoding aspect of the present invention may be incorporated.

Turning to the decompression aspect of the invention, FIG. 15 shows the computer system 20 adapted for decoding the encoded image data 70. In FIG. 15, like numbered-components to those of FIG. 1 represent similar components having similar functions. However, in FIG. 15, the sub-palette data 42 is shown as being included within the encoded image data 70 as described above. Moreover, a decoding process 98 is provided, which, as a counterpart process to the encoding process of FIG. 1, processes the encoded image data 70 in order to write the decoded image data 44 into the memory 24. Lastly, the displayed image 36 has been changed in FIG. 15 (with respect to FIG. 1) to a generally diamond-shaped image 36, to better point out certain features of the decompression process.

Figure 16:
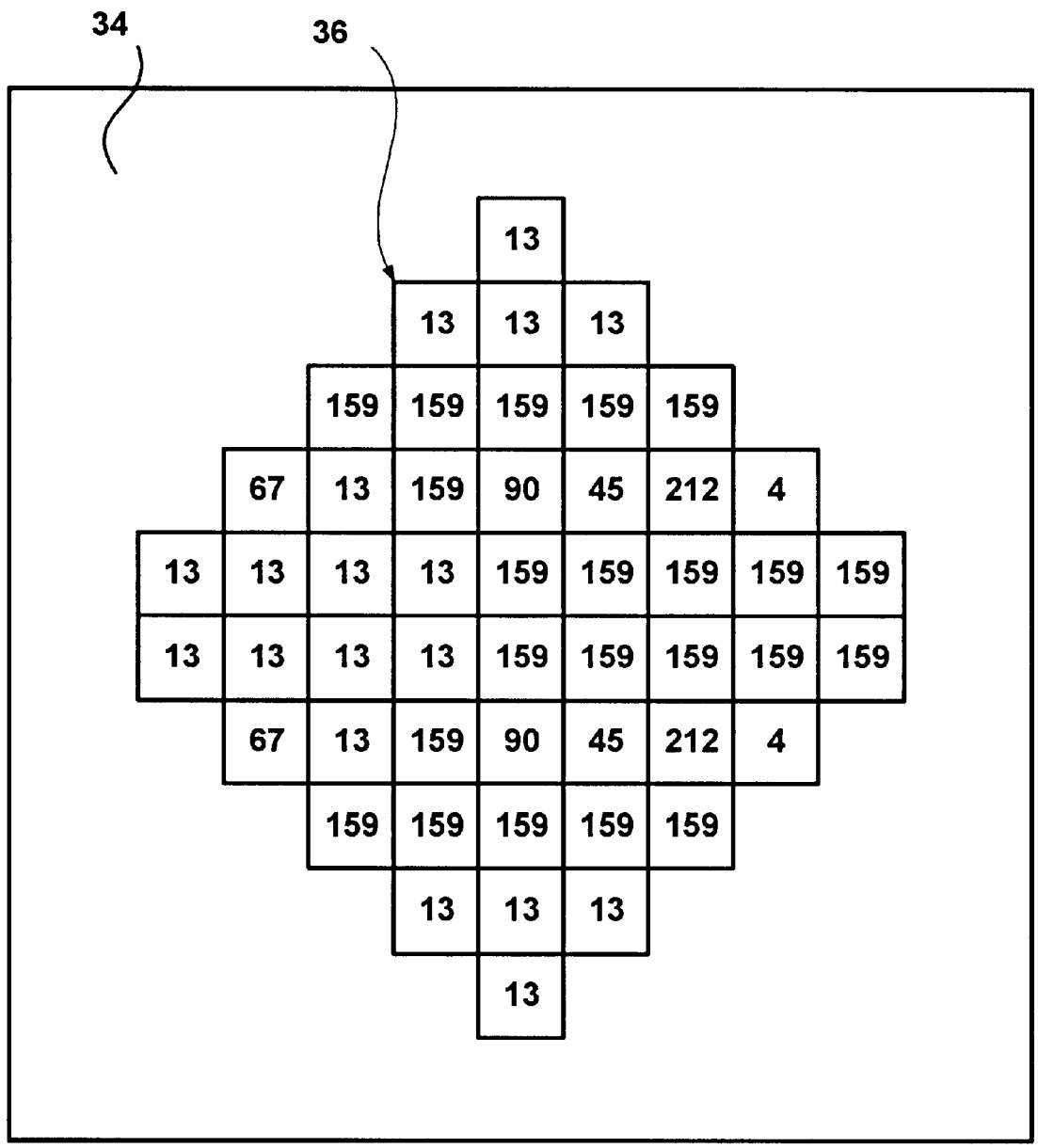
FIG. 16 is a diagram of an array of pixels forming an image.

FIG. 16 shows the diamond-shaped image 36 in more detail, with the color indexes to a 256-color table shown in each pixel. FIG. 17 shows how the image is generally re-indexed by the encoding process prior to fully encoding the image into the encoded data 70, i.e., the pixels are rectangularized via transparent pixels, and reduced color information (three bits for sub-palette color indices zero through seven) is substituted for the pixel colors.

Figure 18:
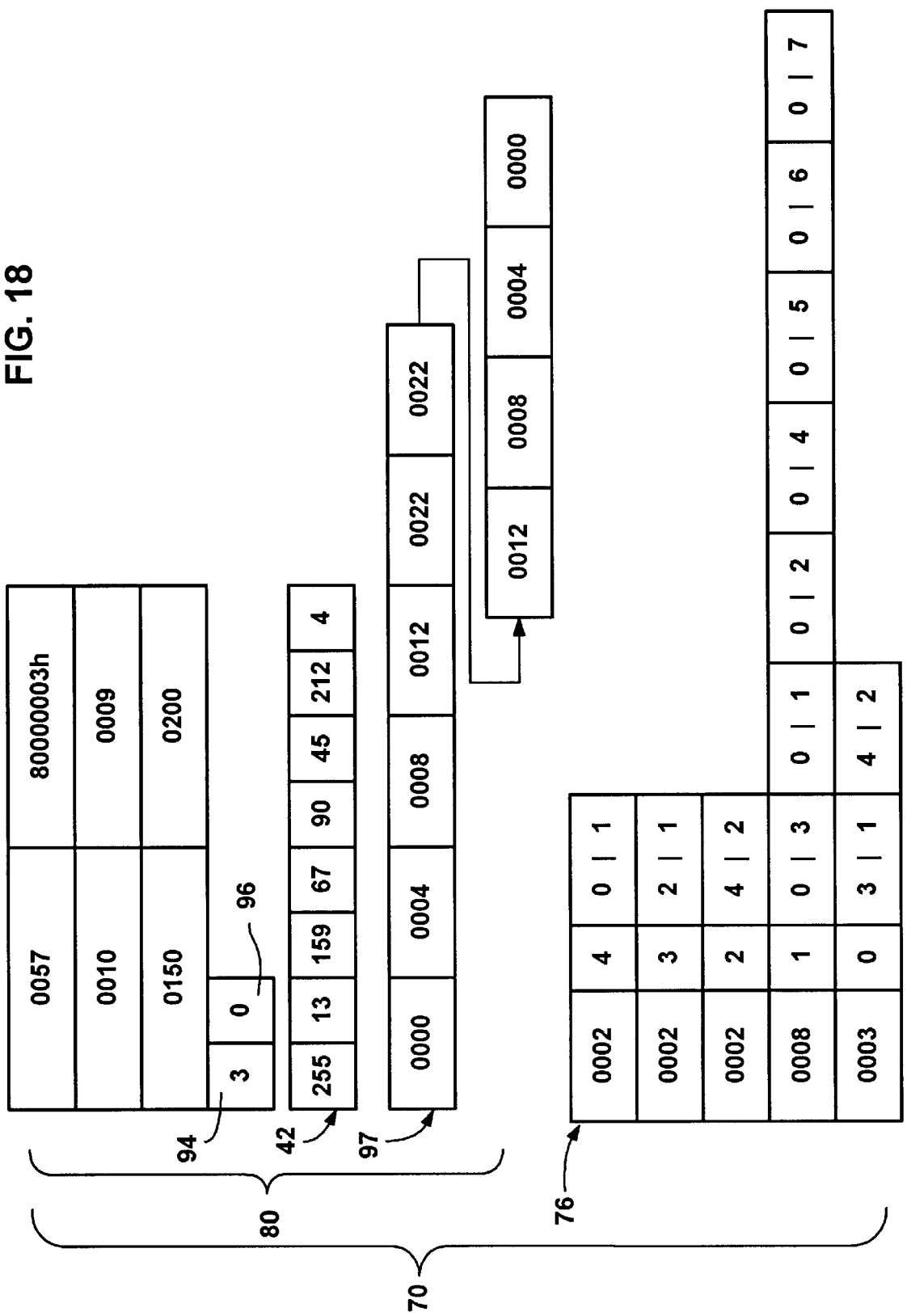
FIG. 18 is a representation of a data structure for storing the compressed image of FIG. 16.

As described in detail above, FIG. 18 represents how the diamond-shaped image of FIG. 16 is encoded into the encoded image data 70, with header 80 and row data 76. Note that in FIG. 18, for this particular image, the value of the encoding byte 94 equals three, the alignment byte 96 equals zero, and the sub-palette 42 is stored in $2^3$ (eight) bytes.

However, rather than always decompress an entire image, the present invention facilitates the decompression of partial images, known as clipped images. An image is said to be clipped if the image to be redrawn is a rectangular portion of a full image that is less in height and/or length than the full image. For example, if a first image 99 (FIG. 20A) is partially covering a second image 36 and the first image 99 is moved, only the pixels of the second image that were covered need to be redrawn to restore the second image to a full image. However, rather than figure out and restore the former value of each pixel, it is more efficient and less complex to redraw the portion of the second image as a rectangle (clipped image) even if the image above the second image was not rectangular. The region that needs to be redrawn when an image (e.g., the image 99) is moved is referred to as a dirty rectangle 100, shown as a dashed box in FIG. 20B. Note that for purposes of clarity the dirty rectangle 100 is shown as being slightly larger than the rectangular area of pixels to be restored. Nevertheless, it is understood that the dashed-box is not intended to suggest that partial pixels are somehow to be restored, but rather, only those pixels that wholly fit within the dashed box are to be restored.

A dirty rectangle 100 may be larger than the clipped portion of the second image, and/or the second image 36 may contain transparent pixels, in which case other underlying images (or portions thereof) will need to be redrawn in an appropriate order to properly restore the display. However, for purposes of simplicity in the following examples, it is assumed that any such prior redrawing has taken place, and the dirty rectangle 100 will be fully redrawn once the clipped portion of the image 36 is restored.

Figure 20A:
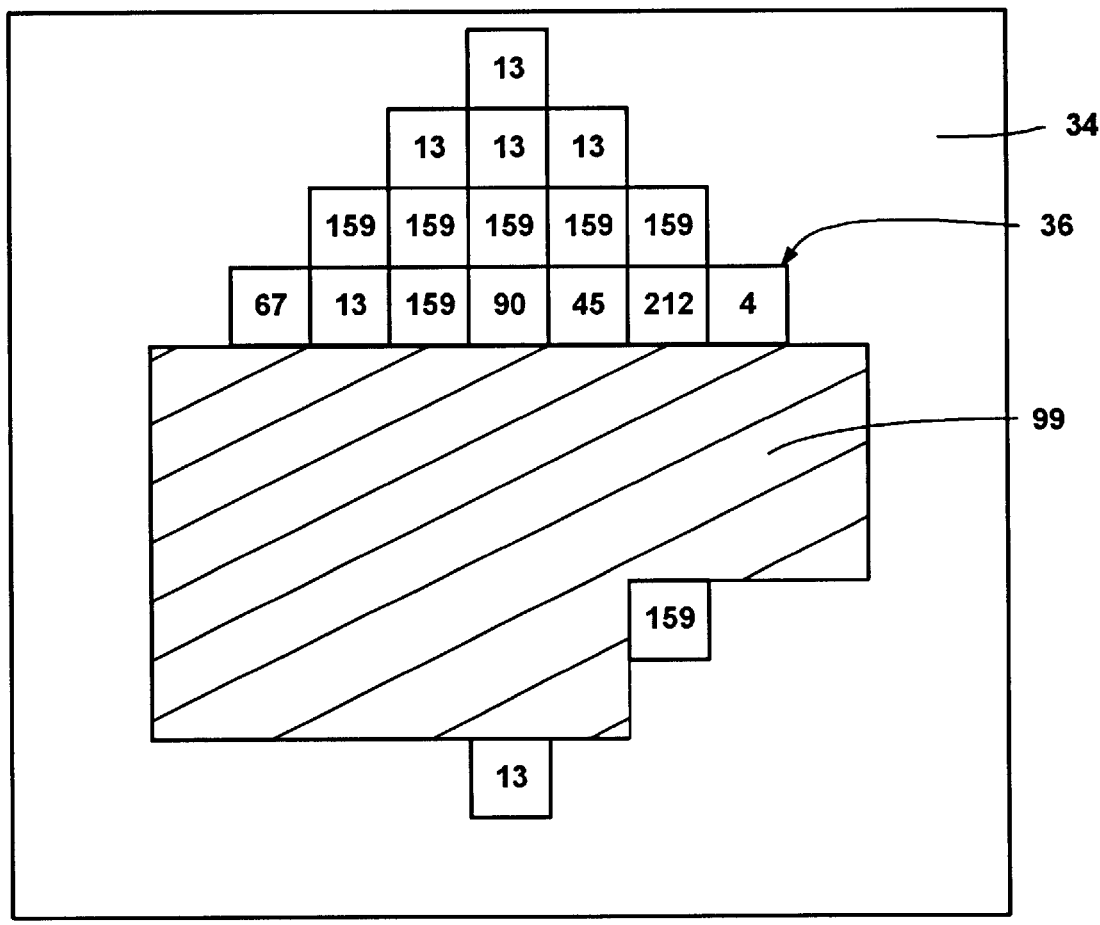
FIGS. 20A–20C are representations of the array of pixels of FIG. 16 at various stages of the decoding process.
Figure 20B:
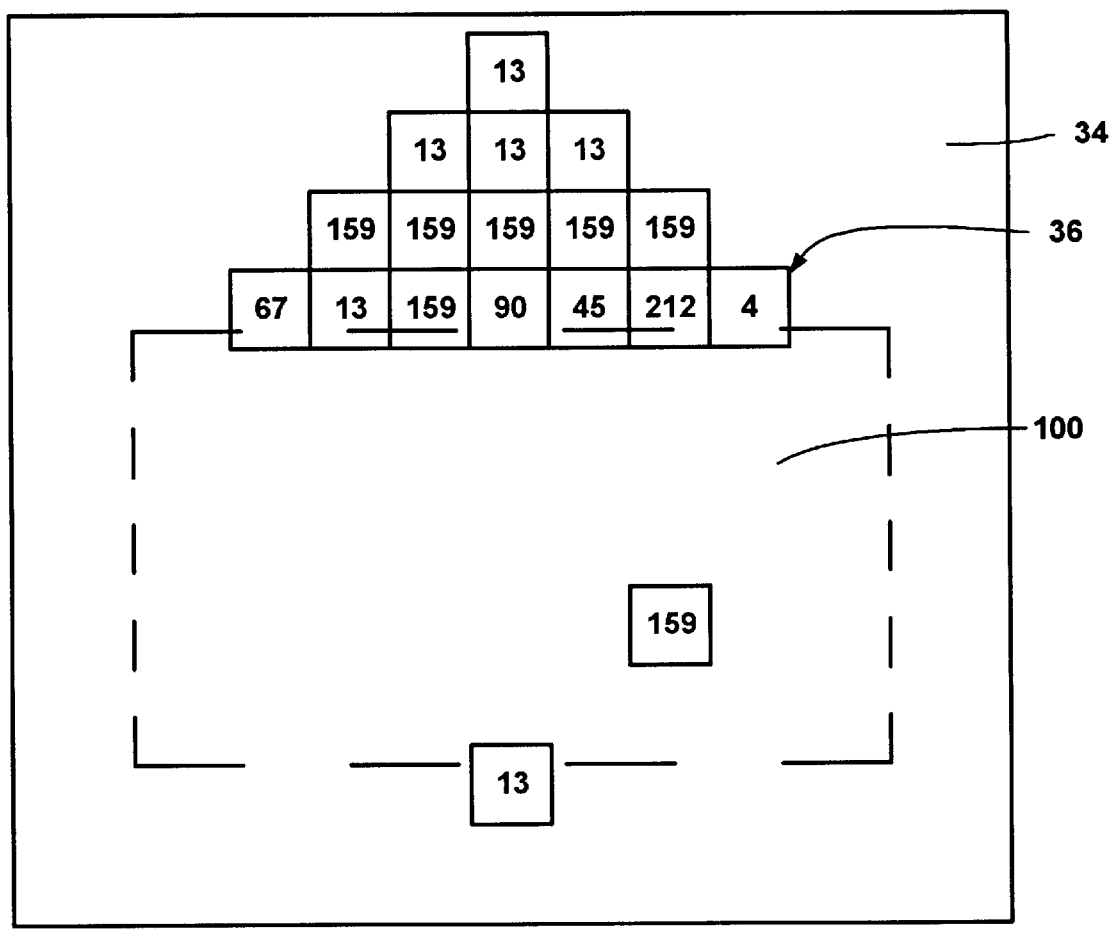

In a first example, FIG. 20A shows the generally diamond-shaped image of FIG. 16, but with the overlying first image 99. In FIG. 20B, the first image 99 has been removed, which, although the image 99 is not rectangular, leaves the dirty rectangle 100. To restore the pixels in the display 34, the underlying image 36, stored in the variable run length compressed format described above, is uncompressed in accordance with the present invention.

Accordingly, the decoding aspect of the invention will now be described with reference to the flow diagram of FIGS. 19A–19E. Note that decompression algorithm exemplified in the flow diagram of FIGS. 19A–19E facilitates the decoding of an entire image or a clipped image. However, for purposes of the following examples, the decoding process 98 will be shown performing the more complex task of decoding a clipped image, starting with decoding the clipped portion of the image 36 to restore the dirty rectangle 100 of FIG. 20B.

Figure 19A:
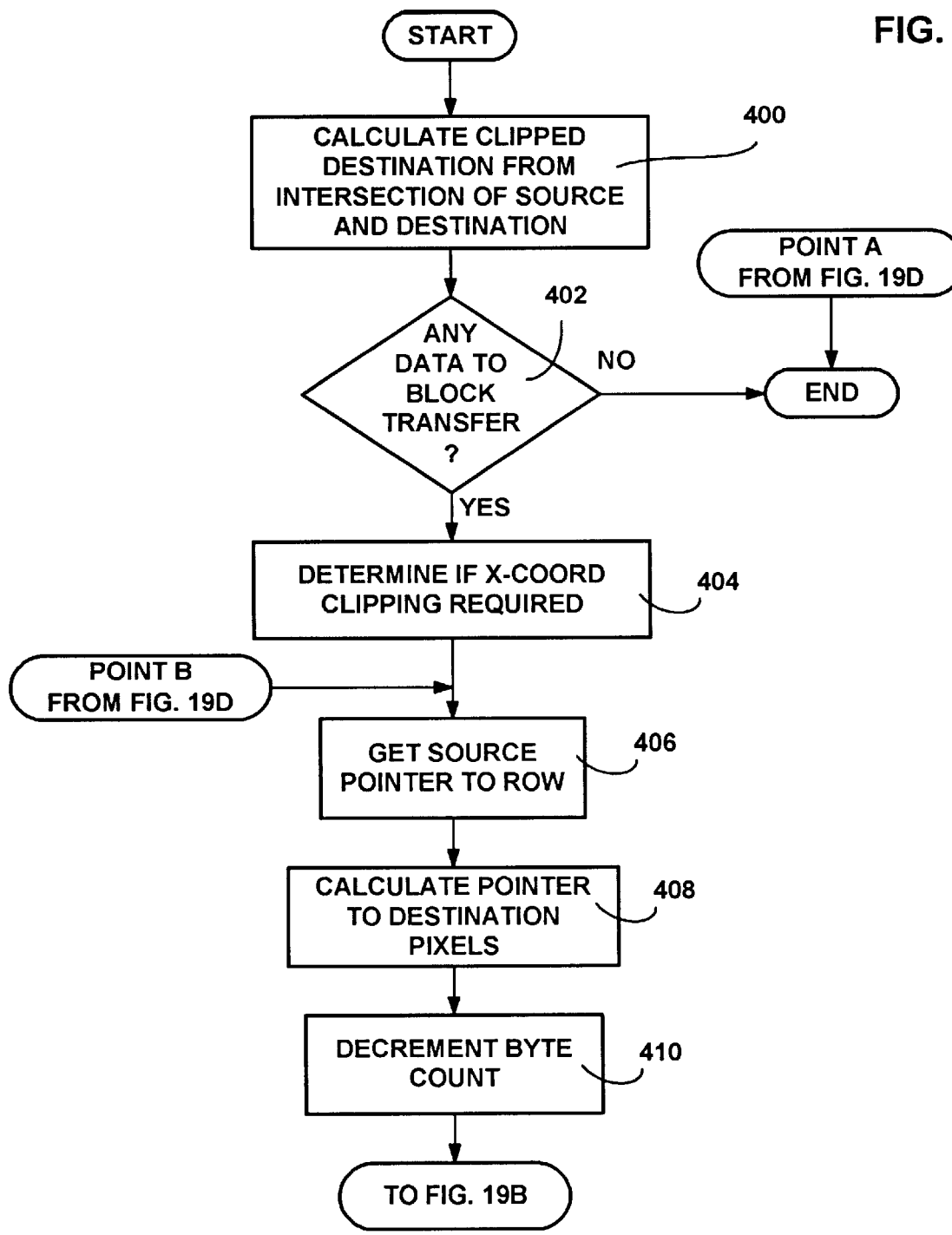
FIGS. 19A–19E comprise a flow diagram representing the general steps taken in decompressing an image in accordance with the present invention.

Beginning at step 400 of FIG. 19A, the size of the clipped destination rectangle is determined from the intersection of the source and destination rectangles. This ensures that the destination rectangle is never larger (in either the x-direction or y-direction) than the source rectangle.

Next, step 402 tests to determine if there is any data to transfer to the memory (e.g., video RAM) 24. More particularly, if either the length or the height of the destination rectangle is zero, there is no change to the display. If so, the process ends, returning an appropriate errorcode or the like to indicate that no data was transferred. For purposes of the present example, the intersection of the source and destination rectangles results in a rectangle with data to transfer, so the process continues to step 404. Step 404 determines whether any clipping in the x-direction will be required, a determination which is later tested at step 422 of FIG. 19B, (described below).

In accordance with one aspect of the present invention, the use of the row pointers 97 (FIG. 18) provides a rapid and efficient mechanism that facilitates image clipping in the vertical direction. To this end, the appropriate row pointer establishes the value of a source pointer for the row at step 406, taking into consideration any vertical clipping. In the present example, as shown in FIGS. 16 and 20A–20C, the first four rows (e.g., rows zero to three) need not be transferred to restore the image. This is determined by evaluating the location and size of the dirty rectangle 100 with respect to the location and size of the underlying image 36. In this manner, it is determined that the first row is row four and the last row is row eight. In the present example, the fourth row corresponds to the fourth word, which points to offset 22 (decimal). The offset value is shifted left as necessary based on the alignment byte 96, (herein zero)

The compressed image data of the fourth row is thus located by the row pointer in an extremely rapid manner, and as shown in FIG. 18, is the row which is three bytes long in its encoded length, having zero skip bits, a run length of four (three plus one) of color one and a run length of five (four plus one) of color value two. At this point, the source pointer points to the first byte in this row, and the process continues to step 408, where the actual location of the first destination pixel in the memory 24, corresponding to the first row and column to be restored, is calculated in a known manner.

Step 410 decrements the byte count for this row to reflect the upcoming processing of the first byte, i.e., the skip byte. Step 420 (FIG. 19B) then tests the byte count to determine if the byte count for the row was only one byte, i.e., the row is a blank line. If so, the row is done, whereby the process branches to step 468 of FIG. 19D to test if there is another row of data to be processed.

Figure 19B:
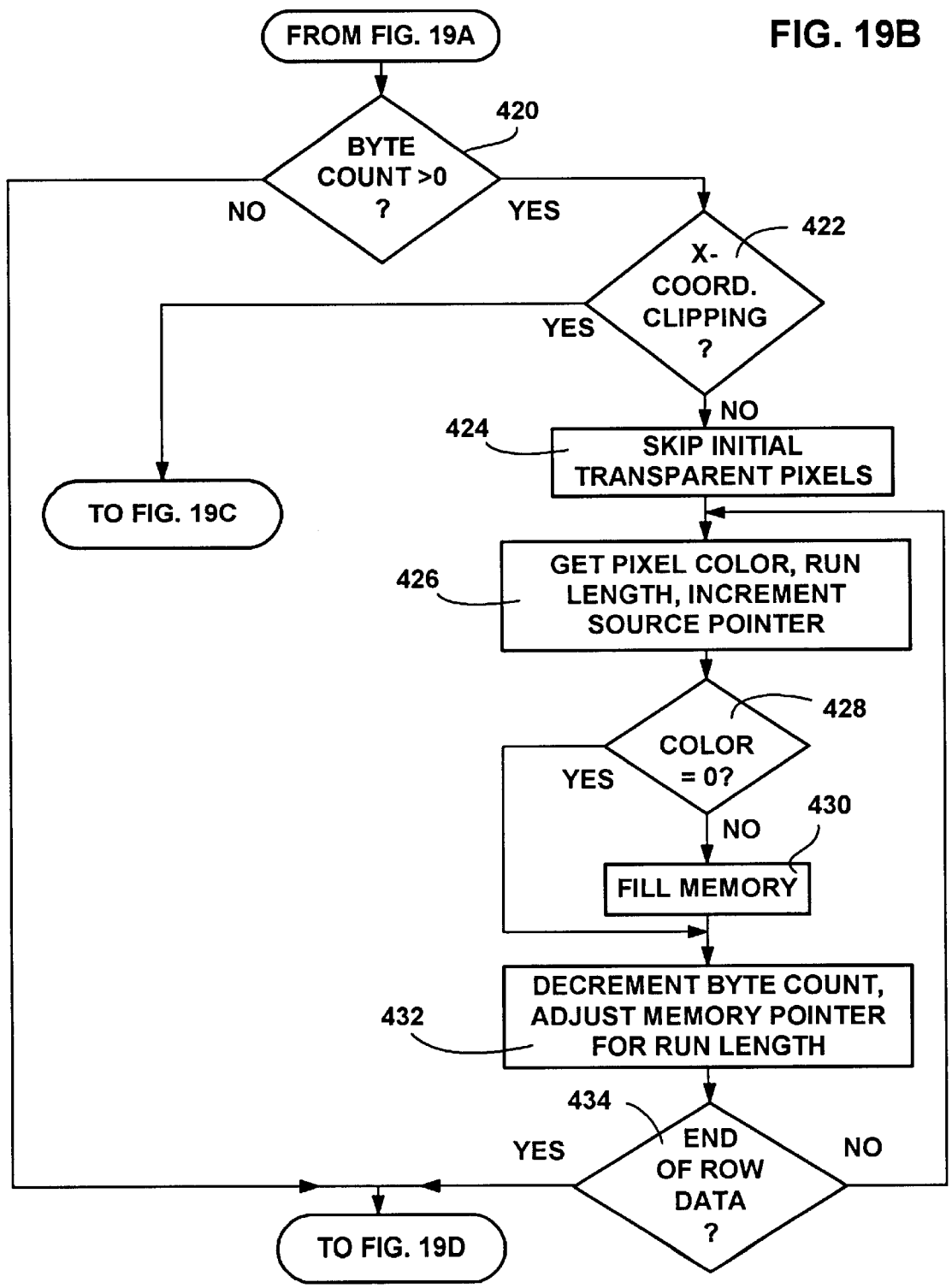
Figure 20C:
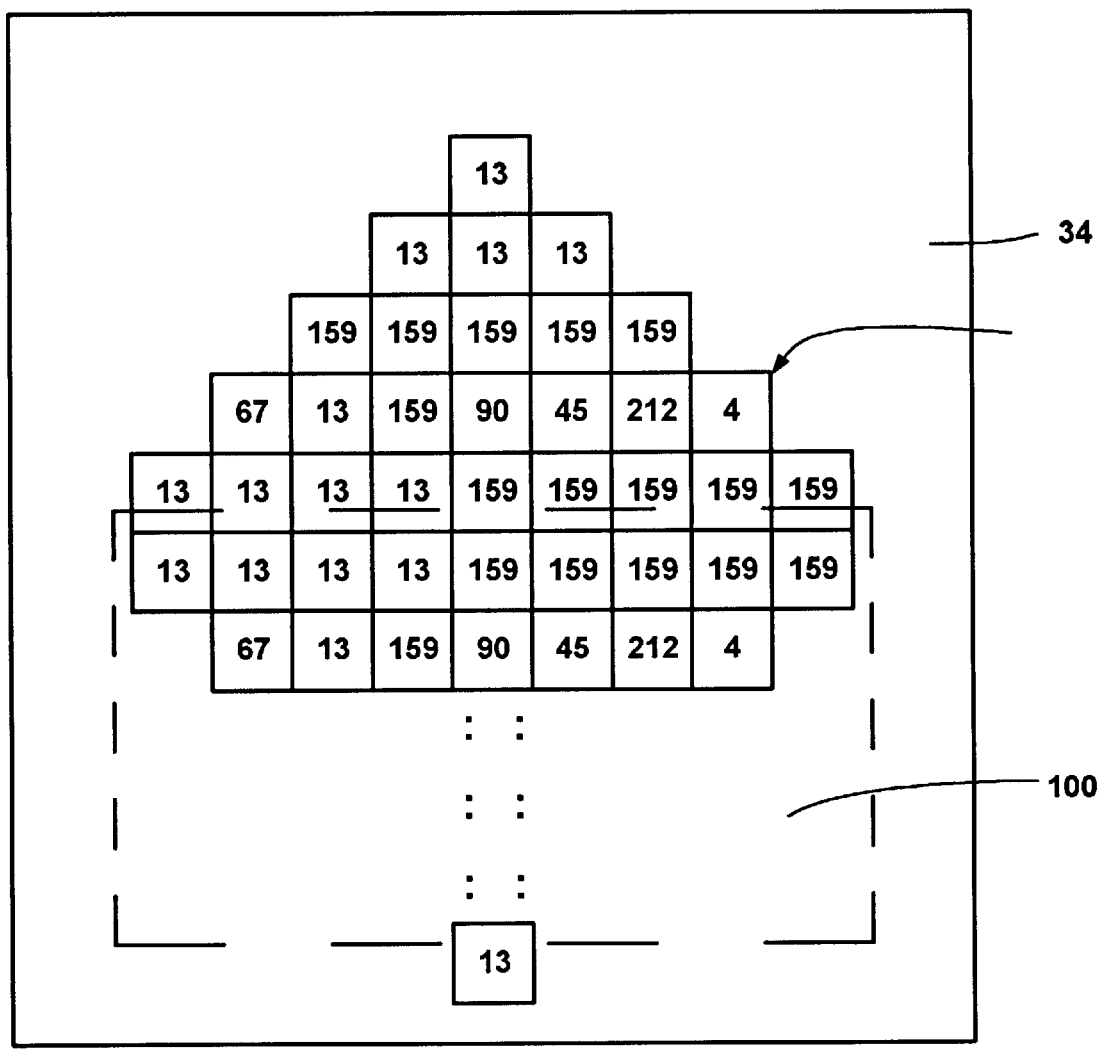

In the present example, however, two bytes remain in the compressed row data, and thus the process branches to step 422 to determine if there is clipping of the image in the x-direction, i.e., whether the left or right side is clipped as determined by the size of the source length versus the size of the destination length. As represented by FIGS. 20A–20C, in this first example there is no x-clipping, and thus the process branches to step 424 (FIG. 19B).

At step 424, any initial transparent pixels are skipped, i.e., the memory destination pointer is increased by the skip value, (zero for the fourth row). Step 426 extracts the pixel color of one and the run length of four (three plus one) from the first split, compressed byte in the row data, and, once this byte has been read, the source pointer is incremented to point to the next source location. Then, at step 428 the color is tested to determine if the byte represents one or more transparent pixels for the given run length. Note that an image can contain transparent pixels in its encoded row data if transparent pixels appear between non-transparent pixels in the same row. Similarly, as described above, transparent pixels appear in encoded row data if a row begins with more transparent pixels than the initial storage unit therefor can encode, e.g., if a byte is allocated for storing initial transparent pixels in each row but more than 255 transparent pixels start a given row. Note that as also described above, transparent pixels at the end of a row are not encoded, as the decoding process terminates for each row based upon the byte count stored in the word at the beginning of each compressed row.

As a result, if transparent pixels are encoded in a compressed byte, the step of writing to the memory 24 (step 430) is effectively skipped over for that run length by step 428. Conversely, if the pixel is non-zero, non-transparent, step 428 branches to step 430 wherein the value in the memory is overwritten with the actual value stored in the corresponding sub-palette 42 for the given run length. In the present example, the encoded value is one, which corresponds to a color of thirteen in the sub-palette 42. Accordingly, in the present example, at step 430 the memory 24 at the proper destination location is filled with a value of thirteen for the next four columns, since the run length is four.

At step 432, the byte count tracking the remaining row data is decremented, and the destination memory pointer is increased based on the run length, whether transparent or non-transparent data was determined. In the present example, the current byte count value for this row, two, is decremented to reflect the processing of the first split length and color byte, whereby the byte count for this row is now at one. Step 434 tests the remaining byte count to determine if the row data is finished, and since the value is non-zero, returns to step 426 to similarly decompress the next compressed byte.

As is understood, the next time through steps 426–432, the color represented by the reduced palette value of two, i.e., the 256-color value of 159, is written to the next five memory locations. However, after this, since the remaining byte count reaches zero at step 432, step 434 determines that the end of the row data has been reached. As a result, the process branches to step 468 of FIG. 19D wherein the row is tested to determine if the last row (row eight in this example) of data has been decoded. Since only row four has been decoded at this time in the present example, the row is incremented (step 470, FIG. 19D) to the next row, row five, and the process continued by returning to step 406 of FIG. 19A.

As can be appreciated, the remaining rows five through eight are decoded in the same general manner as row four, although of course, the destination pointer to the memory is appropriately adjusted (increased) for each new row. Indeed, row five is identical in pixel values to row four, and the row pointer (of offset value twenty-two decimal) is the same. Consequently, other than the starting destination location in the memory 24 and the starting value of the source pointer, steps 424–434 will execute the same way for row five as described above for row four.

However, row six (offset pointer twelve decimal) has different row data including a single initial transparent byte. This initial transparent byte increases the starting destination pointer by one at step 424. Further, while steps 426–430 will fill the memory with the appropriate pixel colors represented in this row data, the byte count (0008 for this row data of offset twelve) will end the row data before the full nine-pixel width of the rectangularized image is restored for this row. As can be appreciated, the row data is completed in less pixels because of the transparent pixel at the end thereof. FIG. 20C shows how the image appears after row six has been restored.

The decoding process 98 is generally the same for rows seven and eight, after which the image 36 will again appear as it originally did in FIG. 16. Note that once row eight has been written, step 468 of FIG. 19D will be true. At that time, the decoding process 98 will return to FIG. 19A (at point A thereof) where the process will end. If desired, a code or the like indicative of success can be returned to the process that originally requested the image decompression.

Figure 21A:
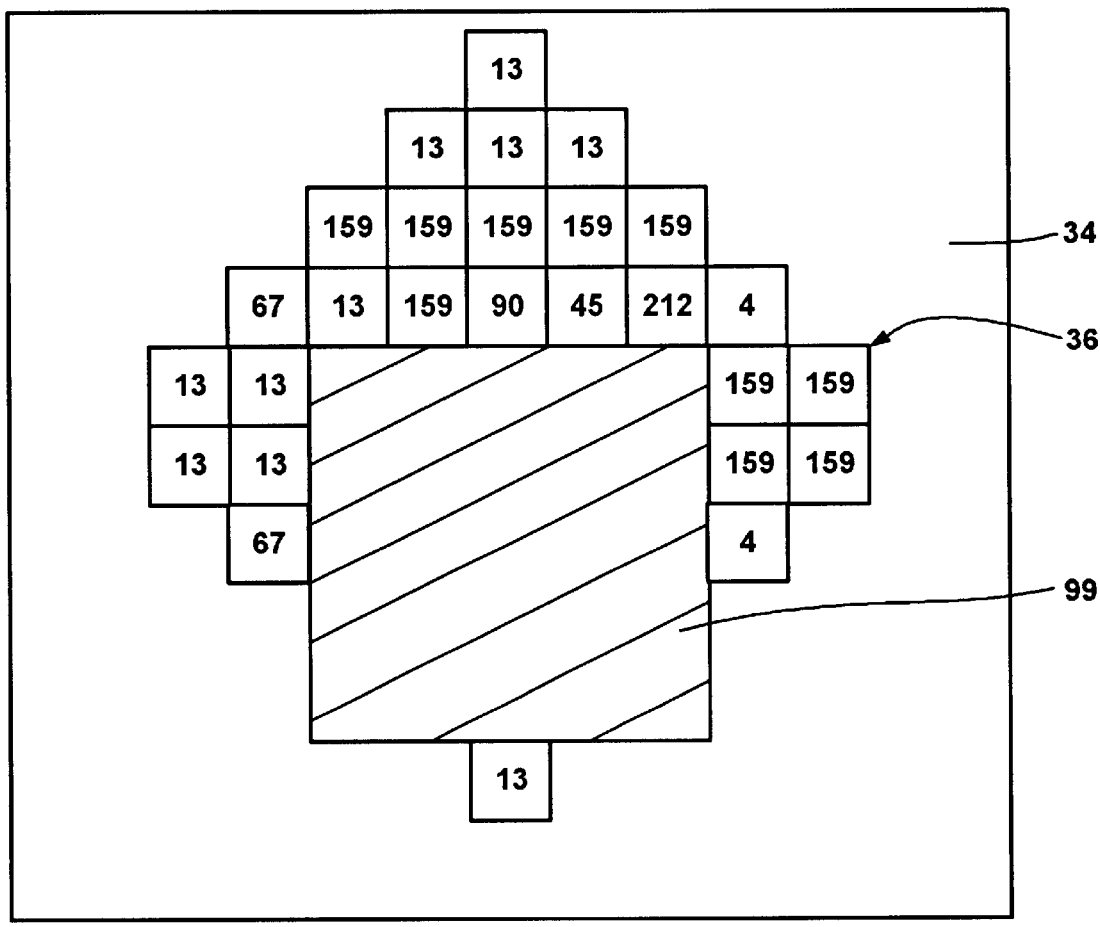
FIGS. 21A–21C are representations of the array of pixels of FIG. 16 at various stages of the decoding process showing x-coordinate clipping.
Figure 21B:
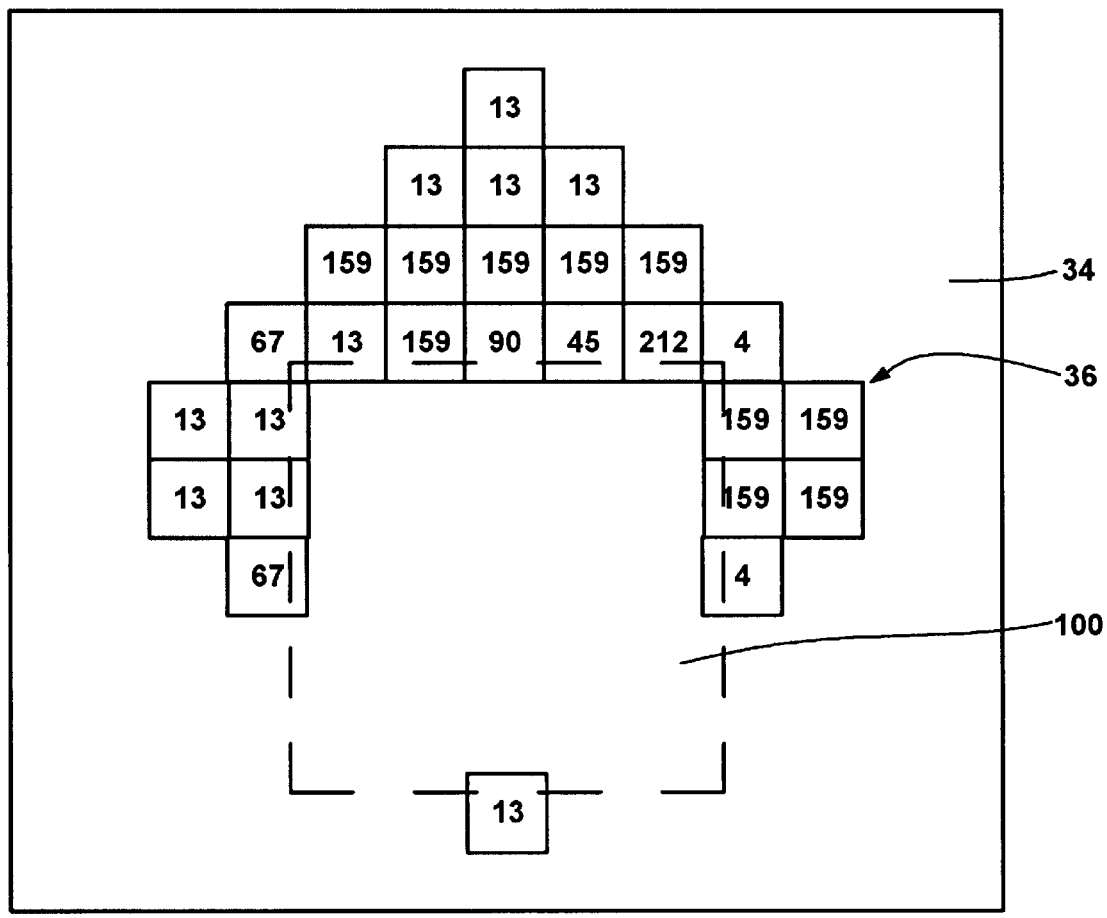
Figure 21C:
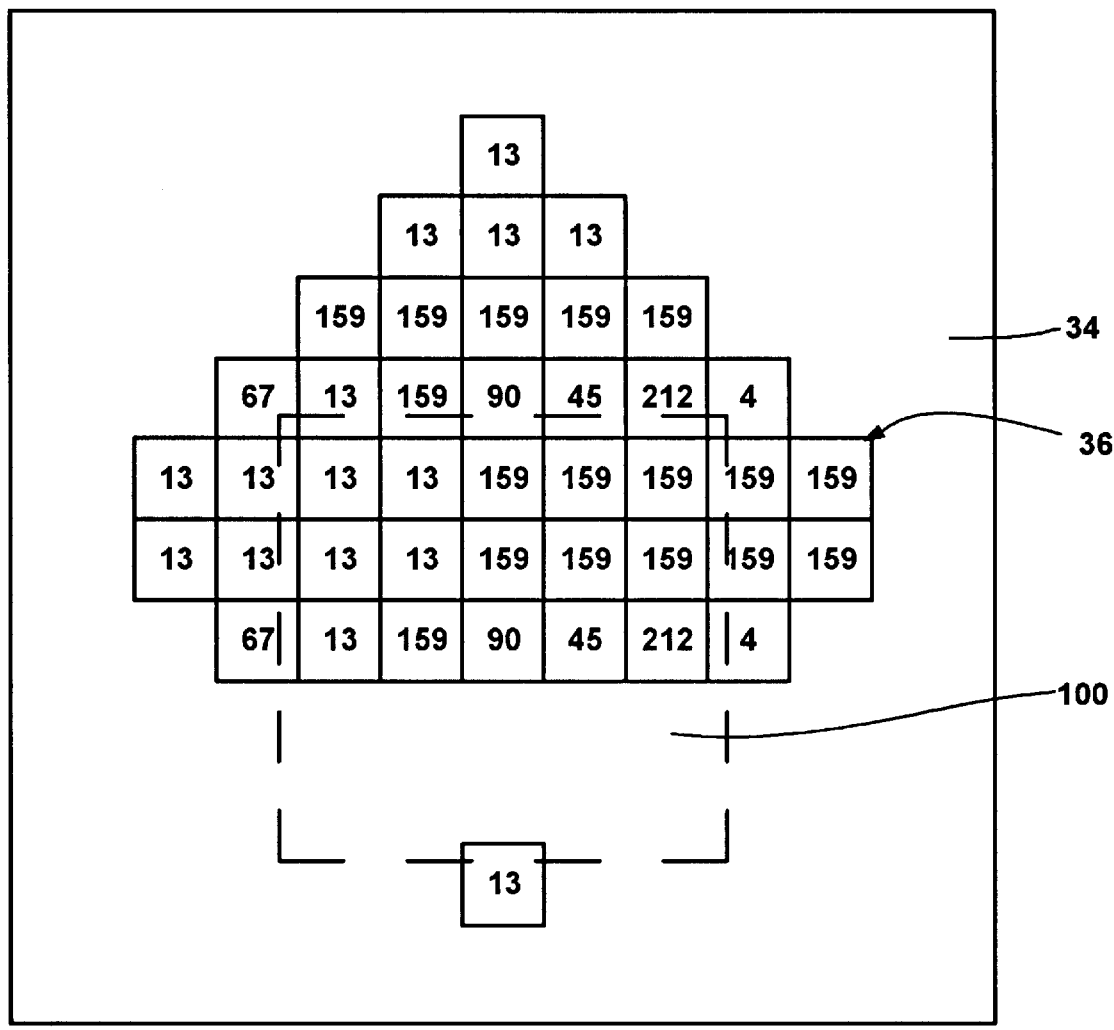

Turning to an example of an image that is clipped on its left and/or right sides (x-coordinate), the portion of the image represented in FIGS. 16 and 21A–21C will be decompressed, again according to the general steps of the flow diagram of FIGS. 19A–19E. In this second example, the first image 99 is again above the diamond-shaped image (FIG. 21A), and is removed leaving the dirty rectangle 100 as shown in FIG. 21B. As can be appreciated, the steps of FIG. 19A and 19B are generally the same as described above with respect to FIGS. 20A–20C, until step 422 (FIG. 19B) determines that x-coordinate clipping is required. Consequently, step 422 branches to step 440 of FIG. 19C.

Since x-coordinate clipping is present, step 440 first modifies the skip count, if any, to reflect the two-pixel clipping of the left side. In the present example, no bytes are initially transparent in row five, and thus the skip count remains at two (two pixels clipped minus the zero transparent pixels). Note that if the first three pixels in the row data had been transparent with the first two pixels clipped, then the skip count would be changed to minus one, as described below with respect to row eight.

Step 442 then tests to determine if clipping needs to be performed, i.e., if the skip count is greater than zero. Since in the present example the skip count is positive two, step 442 branches to step 444 where the row data is examined to find the leftmost, non-transparent pixel or pixels. This is performed because, as in the present example, the run length boundary may not coincide precisely with the clipping, and only a portion of the first non-transparent run length may be painted.

Step 444 gets the run length and color from the compressed byte pointed to by the source pointer. Also at step 444, once the run length is known, the skip count is lowered by the run length, and the source pointer is incremented to point to the next source byte. At step 446, the byte count is decremented to reflect the handling of the byte (by step 444).

Step 448 tests the skip count to determine if it is still greater than or equal to zero. If it is, the process branches to step 450 where the byte count is tested (against zero) to determine if the row has further data therein. If at step 450 the byte count is not zero, the process loops back to step 444, whereby the skip count is successively lowered by each run length in the row data at step 444 until the skip count becomes negative (as tested by step 448) or no more row data remains (as tested by step 450).

However, if the skip count was negative at step 448, (or becomes negative via the above-described looping operation), and the color is non-zero at step 452, the memory is written with the color at step 454. The memory is written for a length equal to the negative of the skip count, thereby painting the non-transparent pixels for a portion of the run length. In the present example, the first run length (of color one) is obtained at step 444. This first run length in row five is four (three plus one), and thus the skip count of two is lowered by four, (step 444) becoming minus two. As a result, step 448 branches to step 452, whereby the non-zero color causes the decoding process 98 to branch to step 454. At step 454, the pixel value which corresponds to the sub-palette index of one, i.e., color 13, is written to the memory 24 for a length of two (negative the minus two of the skip count).

Figure 19C:
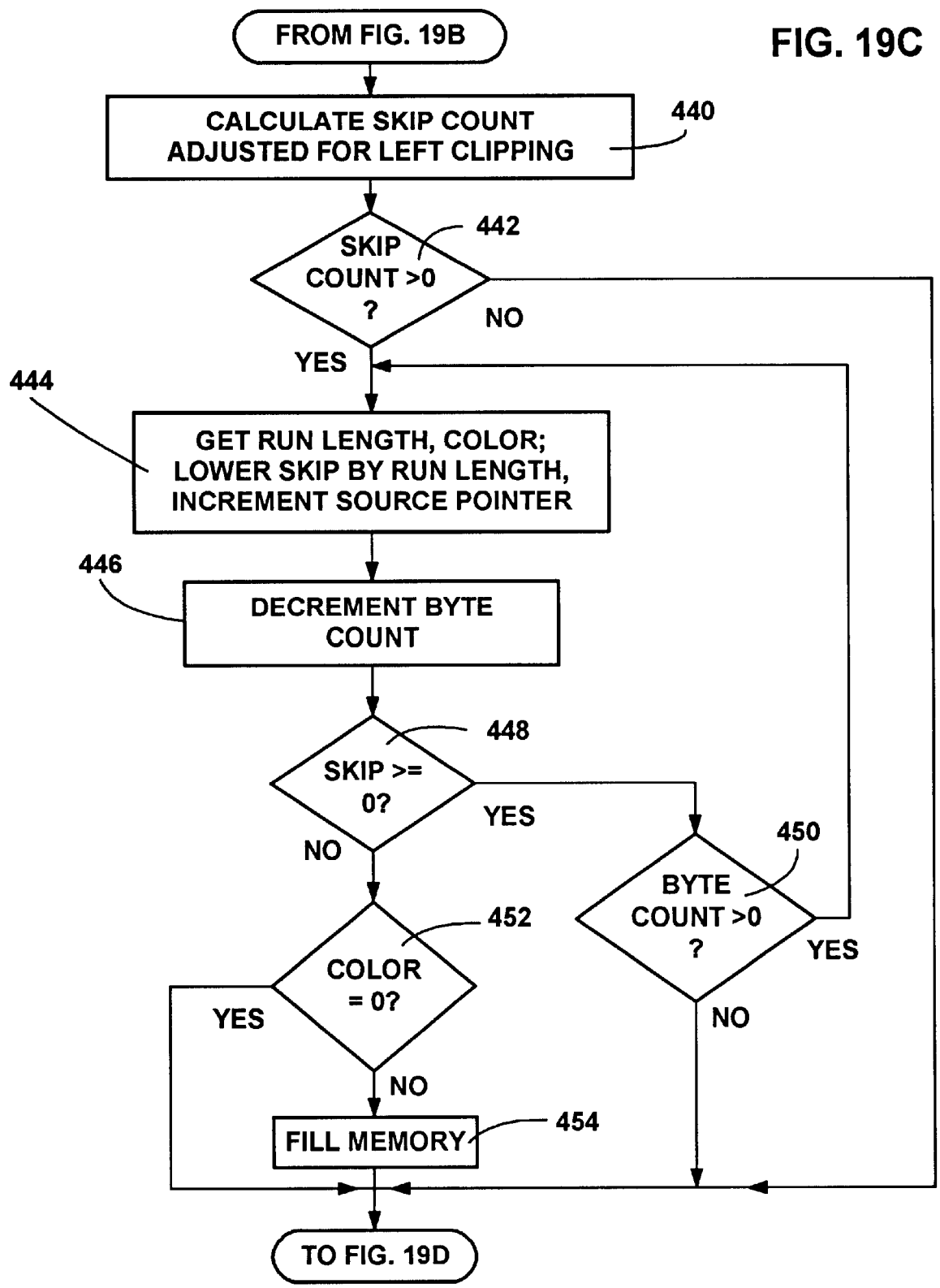
Figure 19D:
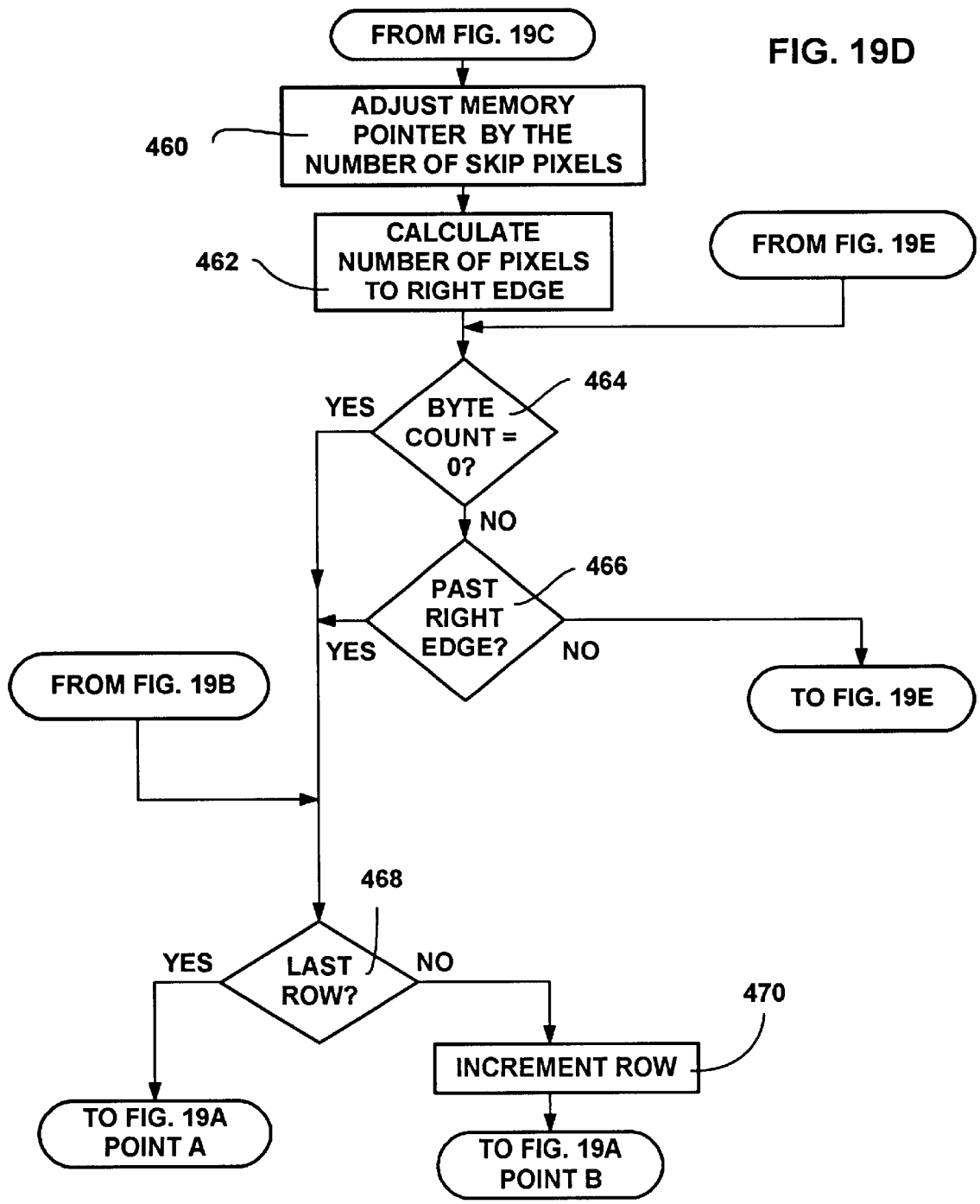
Figure 19E:
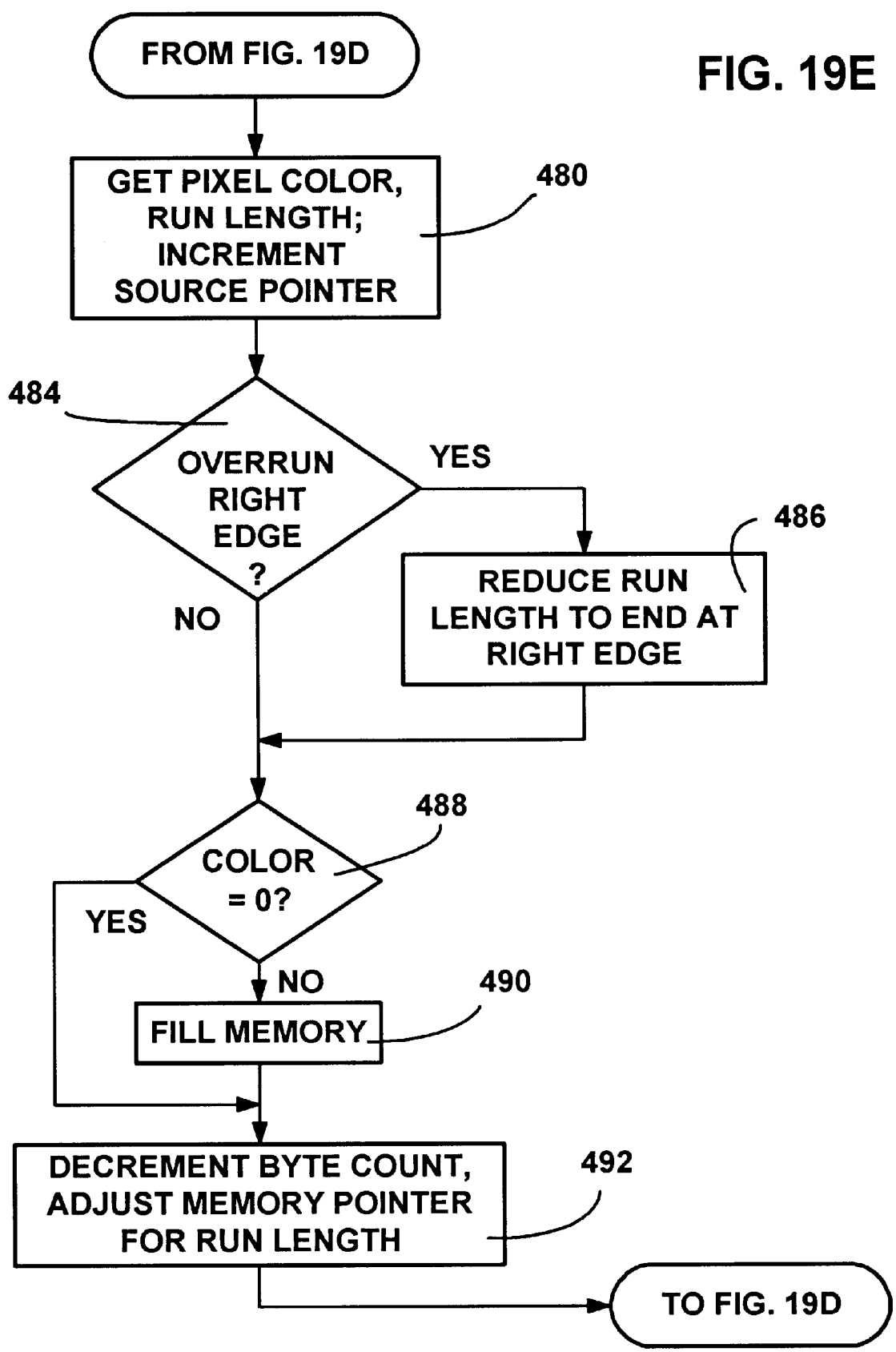

Next, the decoding process 98 continues to step 460 of FIG. 19D where the destination pointer to the memory 24 is adjusted based on the number of skipped pixels. Note that the skip number is negative at this time, and to adjust, the destination pointer is added to the negative of this negative value. Then, at step 462, the number of pixels to the right edge of the destination rectangle is calculated, i.e., the length of the rectangle plus the negative skip count. In the present example the length of the destination rectangle is five, and thus there are three pixels remaining to the right edge.

Step 464 determines if the byte count is zero, in which event there is no more row data to write to memory for this row. Such a situation occurs when the rectangularized image has transparent bytes at its right edge. However, if row data remains to be written, step 466 tests to see if the right edge is clipped, i.e., whether the number of pixels remaining to the right edge is greater than zero. Since in the present example some row data remains (the byte count is not zero) and there are three pixels remaining to the right edge, the decoding process continues to step 480 of FIG. 19E.

At step 480, the run length and color are extracted from the next byte in the row data, and at step 482 the source pointer is incremented to point to the next source location. Then, step 484 tests to determine if the extracted run length will overrun the right edge of the clipped image if fully written, that is, whether the number of pixels remaining to the right edge minus the run length is less than zero. If so, as in the present example wherein three pixels remain to the right edge and the run length is five, the extracted run length is reduced to the value of the remaining pixels, three, at step 486.

Step 488 tests if the color of this run length is zero indicating transparent pixels, and if not, the memory 24 is written with the color value (of 159) at step 490. Although in the present example the row is now complete, it can be appreciated that in other images, compressed bytes may remain to be uncompressed in a given row of data. Thus, step 492 decrements the byte count for the row and adjusts the memory pointer based on the run length that was written. The decoding process 98 loops back to step 464 of FIG. 19D, where the byte count is again evaluated for a zero value and this time found to equal zero. As a result, the process branches to step 468 to test if the last row was written.

As can be appreciated, row six is identical to row five and thus the steps of FIGS. 19B–19E are the same therefor. Row seven is processed similar to row five and row six because of the x-coordinate clipping in this image. Thus, as can be appreciated from following the steps described above, row seven is first processed using steps 406–422, (FIGS. 19A–19B). For row seven, the process then branches to step 440, (FIG. 19C), and follows steps 440–470 (FIGS. 19C–19D).

Lastly, row eight has three transparent pixels at the beginning (and also the end) thereof. As a result of step 440 (FIG. 19C), the skip count is negative one at step 442, and step 442 branches to step 460 of FIG. 19D, wherein the memory pointer is increased by the negative of this value, i.e., increased by one. At this time, the first pixel to be written is thus one past the transparent pixel, and thus both the clipping and initial transparent bytes have been handled. Next, step 462 determines that four pixels remain to the right edge.

Following the steps in conjunction with the row data (row eight, having offset four) of FIG. 18, it is seen that the first time through the loop of steps 464 (FIG. 19D)–492 (FIG. 19E), with run length three and reduced color value one, the right edge is not overrun at step 484, the three bytes of value 13 are properly written to the memory 24 at step 490, and the byte count is lowered to zero at step 492. Row eight is now complete, and the next time attempting to traverse this loop, step 464 detects the zero byte count whereby the process branches to step 468. At step 468, the last row (row eight) is detected, ending the decoding process 98 for this clipped image.

As can be appreciated, the decoding process 98 rapidly and efficiently decompresses the variable run length encoded image data and writes the data to memory for clipped or non-clipped images. Indeed, the decoding process 98 is so rapid that it is capable of being incorporated into the video block transfer routines of an operating system. Because the decoding process takes advantage of row pointers for decompressing image data, images clipped in the vertical direction are handled with extreme efficiency, and are often faster than restoring vertically clipped, non-compressed data. Similarly, images clipped in the horizontal direction are also handled efficiently by adjusting for leading and trailing transparent pixels.

As can be seen from the foregoing detailed description, there is provided a method and system that reduces the amount of data required to encode an image without any loss of data. The method and system redefines the pixel description data as a function of the image data, and provides a compression scheme that facilitates efficient and rapid decompression.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

The co-pending and concurrently filed U.S. Patent Application entitled METHOD AND SYSTEM OF VARIABLE RUN LENGTH IMAGE ENCODING USING SUB-PALETTE, by John W. Gill and Bruce A. Johnson, is hereby incorporated by reference in its entirety.

What is claimed is:

1. A method of decoding a set of compressed data representing an original image including a plurality of rows of pixels into an image of pixels, comprising, accessing the set of compressed data to locate a row pointer, each row pointer in the compressed data pointing to a set of source data within the set of compressed data, the set of source data representing at least part of a row of pixels in the original image data, determining rows of pixels to be decoded into the image, and for each row of pixels determined, decoding the compressed data into a representation of the original image by locating the row pointer to the set of source data, locating the set of source data pointed to by the row pointer, determining a destination memory location corresponding to said row of pixels to be decoded, decoding the set of source data into actual pixel data, and writing the actual pixel data into the determined destination memory location.

2. The method of claim 1 wherein less rows are decoded than sets of source data are stored therefor in the compressed data, and wherein determining the rows of pixels to be decoded into the image includes selecting the first row and the last row to be decoded.

3. The method of claim 2 wherein for each row of pixels determined, decoding the compressed data by locating the row pointer includes locating the row pointer for the set of source data from the first row through the last row.

4. The method of claim 1 wherein the set of source data for each row includes a value indicative of a number of transparent pixels at the beginning of each row of pixels, and wherein determining a destination memory location further includes adjusting the memory location based on the number of transparent pixels.

5. The method of claim 1 wherein the set of source data for each row includes a count value indicative of the amount of row data stored therefor, and wherein decoding the set of source data into actual pixel data includes tracking the amount of data decoded with respect to the count value, and halting the decoding for the row when the amount of data decoded corresponds to the count value.

6. The method of claim 1 wherein the pixel data is encoded into units of storage in the set of source data, each unit including a run length and a color value, and decoding the set of data into actual pixel data includes extracting the run length and color value from each unit.

7. The method of claim 6 wherein a table of colors is stored with the compressed data, and wherein decoding the set of source data into actual pixel data includes using the color value extracted from each unit as in index into the table.

8. The method of claim 1 wherein less columns of pixels are to be decoded than represented in the sets of source data stored for each row in the compressed data, and wherein determining a destination memory location further includes adjusting the memory location based on the number of columns.

9. The method of claim 4 wherein less columns of pixels are to be decoded than represented in the sets of source data are stored for each row in the compressed data, and wherein determining a destination memory location further includes adjusting the memory location based on the number of columns and the number of transparent pixels.

10. A system of decoding a set of compressed data into a representation of the original image of a plurality of rows of pixels, comprising, a memory including the compressed data, wherein each row of pixels in the image to be decoded has a row pointer corresponding thereto in the set of compressed data and each row pointer points to a set of source data in the set of compressed data that represents at least part of a row of pixels, means for determining the rows of pixels to be decoded into the image, and for each row of pixels determined, means for decompressing the compressed data by locating the row pointer to the set of source data and for locating the set of source data therefrom, means for determining a destination location in the memory corresponding to said row of pixels to be decoded, means for decoding the set of source data into actual pixel data, and means for writing the actual pixel data into the determined destination location in the memory.

11. The system of claim 10 wherein less rows are to be decoded than distinct sets of source data are stored therefor in the compressed data, and wherein the means for determining the rows of pixels to be decoded into the image includes means for selecting the first row and the last row to be decoded.

12. The system of claim 11 wherein for each row of pixels determined, the means for decompressing the compressed data by locating the pointer to the set of source data includes means for locating the pointer for the set of source data from the first row through the last row.

13. The system of claim 10 wherein the set of source data includes a value indicative of a number of transparent pixels at the beginning of each row of pixels, and wherein the means for determining a destination memory location includes means for adjusting the memory location based on the number of transparent pixels.

14. The system of claim 10 wherein the set of source data includes a count value indicative of the amount of row data stored therefor, and wherein the means for decoding the set of source data into actual pixel data includes means for tracking the amount of data decoded with respect to the count value, and means for halting the decoding for the row when the amount of data decoded corresponds to the count value.

15. The system of claim 10 wherein the pixel data is encoded into units of storage in the distinct set of source data, each unit including a run length and a color value, and the means for decoding the distinct set of source data into actual pixel data includes means for extracting the run length and color value from each unit.

16. The system of claim 15 wherein a table of colors is stored with the compressed data, and wherein the means for decoding the distinct set of source data into actual pixel data includes means for using the color value extracted from each unit as in index into the table.

17. The system of claim 10 wherein less columns of pixels are to be decoded than represented in the sets of source data stored in the compressed data, and wherein the means for determining a destination memory location includes means for adjusting the memory location based on the number of columns.

18. The system of claim 13 wherein less columns of pixels are to be decoded than represented in the sets of source data are stored in the compressed data, and wherein the means for determining a destination memory location includes means for adjusting the memory location based on the number of columns and the number of transparent pixels.

19. A method of decoding a set of compressed data into a representation of an original image of a plurality of rows of pixels, comprising:

(a) determining the rows of pixels to be decoded for the image;

(b) for each row of pixels determined, decoding the compressed data by locating and accessing one of a plurality of row pointers corresponding to the row of pixels to be decoded, each row pointer pointing to a set of source data in the set of compressed data that represents at least part of a row of pixels;

(c) determining the first and last row of pixels to be decoded into the image and setting a row counter to a value indicative of the first row;

(d) locating the row pointer to the set of source data for the row of pixels to be decoded based upon the value of the row counter and locating the set of source data from the row pointer;

(e) determining a destination memory location corresponding to the row of pixels to be decoded;

(f) decoding the set of source data into actual pixel data and writing the actual pixel data into the determined destination memory location;

(g) evaluating the row counter against the last row to be decoded; and (h) if the row counter does not indicate that the last row has been decoded, changing the value of the row counter to a value indicative of the next row and repeating steps (d)–(h).

20. The method of claim 19 wherein less rows are decoded than distinct sets of source data are stored therefor in the compressed data.

21. A method of decoding data representative of an image of pixels, comprising, determining a fixed number of bits in a unit of color storage corresponding to a run length and a number of bits corresponding to a color index that represents no more than one color, selecting at least some of the units of color storage having run length, color information therein, and for each selected unit of color storage, obtaining a color index value from a value of the bits therein and obtaining a run length value from a value of the bits therein, looking up pixel information based on the color index value, and outputting the pixel information to a number of pixels based on the run length.

22. The method of claim 21 wherein the unit is a byte.

23. The method of claim 21 wherein determining a fixed number of bits includes accessing information in a header indicative of the number of bits corresponding to the run length and the number of bits corresponding to the color index.

24. The method of claim 21 wherein looking up pixel information includes accessing a table in a header indicative of the pixel values via the index.

25. A computer-readable medium having stored thereon a data structure, comprising:
- a plurality of units of compressed image source data of a plurality of rows, each unit comprising a section indicative of run length in at least one of the rows and another section indicative of a color index;
- a first field including a color table; and
- a second field indicative of a fixed number of bits of the units that represent the run length information and a number of bits that represent the color index, each color index corresponding to one color in the color table.

26. The computer-readable medium having stored thereon the data structure of claim 25 further comprising a fourth field including at least one row pointer to the compressed image source data.

27. The method of claim 1 wherein the set of source data includes a plurality of units of color storage and decoding the set of source data into actual pixel data comprises:
for each unit of color storage,
- determining a color index from within the unit of color storage;
- correlating the color index with a color value stored in a table;
- obtaining a run length from within the unit of color storage corresponding to the color index; and
- duplicating the color value based on the run length value to create the actual pixel data.

28. The method of claim 27 wherein the length of the table corresponds to a color index length for representing the color index in the unit of color storage.

29. The method of claim 27 wherein the table is stored in association with the compressed data.

30. The method of claim 27 wherein the unit of color storage comprises a fixed length number of bits.

31. The method of claim 1 wherein at least two row pointers point to the same set of source data in the compressed data.

32. A computer-readable medium having computer-executable instructions for performing the method of claim 1.

33. The system of claim 10 wherein the row pointer corresponds to two or more rows of pixels in the image to be decoded.

34. A computer-readable medium having computer-executable instructions for performing the method of claim 19.

35. A method of decoding compressed data of an original image into an image of pixels, comprising,
- selecting a fixed unit of color storage from the compressed data, each unit having a number of bits representing a color index and a number of bits representing a run length of one or more pixels having the same output color data that represents no more than one color;
- determining the color index from within the unit of color storage;
- obtaining a run length from within the unit of color storage corresponding to the color index; and
- providing color data for a number of pixels based on the run length and the color index.

36. The method of claim 35 further comprising, providing a differently-colored image of pixels by correlating the color index with a color value stored in a second table that is different from the first table.

37. The method of claim 35 wherein selecting a fixed unit of color storage from the compressed data comprises, accessing the compressed image data to determine a row pointer, and locating the fixed unit based on the row pointer.

38. A method of decoding compressed data of an original image into an image of pixels, comprising,
- selecting a unit of color storage from the compressed data, each unit having a number of bits representing a color index and a number of bits representing a run length;
- determining the color index from within the unit of color storage;
- obtaining a run length from within the unit of color storage corresponding to the color index;
- providing a first image by correlating the color index with a color value stored in a first table to provide first color data for a number of pixels based on the run length and the color value; and
- providing a second image by correlating the color index with a color value stored in a second table that is different from the first table.

39. The method of claim 35 wherein selecting a fixed unit of color storage from the compressed data comprises, accessing the compressed image data to determine a row pointer, and locating the fixed unit based on the row pointer.

* * * * *

UNITED STATES PATENT AND TRADEMARK OFFICE
CERTIFICATE OF CORRECTION

PATENT NO.   : 6,259,810 B1
DATED        : July 10, 2001
INVENTOR(S)  : Gill et al.

It is certified that error appears in the above-identified patent and that said Letters Patent is hereby corrected as shown below:

Column 9,
Line 46, "two, four-bit" should read -- two 4-bit --.

Column 10,
Line 58, "R2, R2" should read -- R2, --.

Column 11,
Line 27, "sixteen bit" should read -- 16-bit --.
Line 37, "R2, R2" should read -- R2, --.
Line 39, "14, 14" should read -- 14, --

Column 17,
Line 45, "similar" should read -- similarly --.

Column 19,
Line 20, "in" should read -- an --.

Column 20,
Line 19, "in" should read -- an --.

Signed and Sealed this

Fifteenth Day of March, 2005

JON W. DUDAS
*Director of the United States Patent and Trademark Office*